(12) United States Patent
Yoshikawa et al.

(10) Patent No.: US 11,784,545 B2
(45) Date of Patent: Oct. 10, 2023

(54) METHOD OF MANUFACTURING STATOR FOR ROTATING ELECTRIC MACHINE

(71) Applicants: DENSO CORPORATION, Kariya (JP); TOYOTA JIDOSHA KABUSHIKI KAISHA, Toyota (JP)

(72) Inventors: Kazuo Yoshikawa, Kariya (JP); Masashi Kitsunezuka, Kariya (JP); Shimpei Fujiwara, Nisshin (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 17/066,926

(22) Filed: Oct. 9, 2020

(65) Prior Publication Data
US 2021/0119520 A1 Apr. 22, 2021

(30) Foreign Application Priority Data
Oct. 16, 2019 (JP) .................................. 2019-189580

(51) Int. Cl.
*H02K 15/12* (2006.01)
*H02K 15/10* (2006.01)
(Continued)

(52) U.S. Cl.
CPC .......... *H02K 15/12* (2013.01); *H02K 15/026* (2013.01); *H02K 15/065* (2013.01); *H02K 15/10* (2013.01); *H02K 15/14* (2013.01)

(58) Field of Classification Search
CPC .. H02K 15/026; H02K 15/065; H02K 15/067; H02K 15/10; H02K 15/12; H02K 15/14
See application file for complete search history.

(56) References Cited

U.S. PATENT DOCUMENTS

| 11,196,326 B2 | 12/2021 | Fujiwara et al. |
| 2012/0032551 A1* | 2/2012 | Yoneda .................... H02K 3/12 310/214 |

(Continued)

FOREIGN PATENT DOCUMENTS

| JP | 2008-154348 A | 7/2008 |
| JP | 2012-039719 A | 2/2012 |

(Continued)

*Primary Examiner* — Minh N Trinh
(74) *Attorney, Agent, or Firm* — Oliff PLC

(57) ABSTRACT

An apparatus for manufacturing a stator includes a placement table, a supporting member and a resistance heating device. The placement table is configured to have a stator core, which has coil segments and insulators inserted in slots thereof, placed thereon. The stator core is formed of steel sheets that are laminated in an axial direction of the stator core. The coil segments together form a stator coil. The insulators are formed of a material that is foamable upon being heated. The supporting member is configured to support, in the axial direction of the stator core, distal end portions of teeth of the stator core so as to prevent gaps from being formed between the steel sheets forming the stator core. The resistance heating device is configured to heat, through energization of the stator coil, the insulators along with the stator coil and thereby cause the insulators to foam.

4 Claims, 20 Drawing Sheets

(51) Int. Cl.
    *H02K 15/06*     (2006.01)
    *H02K 15/02*     (2006.01)
    *H02K 15/14*     (2006.01)

(56) References Cited

U.S. PATENT DOCUMENTS

| | | | |
|---|---|---|---|
| 2012/0319507 A1* | 12/2012 | Ueno | H02K 3/345 |
| | | | 310/43 |
| 2018/0159395 A1 | 6/2018 | Kawanishi | |
| 2019/0173365 A1* | 6/2019 | Fujiwara | B29C 35/02 |
| 2020/0011236 A1 | 1/2020 | Tanno et al. | |
| 2021/0119520 A1* | 4/2021 | Yoshikawa | H02K 15/026 |

FOREIGN PATENT DOCUMENTS

| | | | |
|---|---|---|---|
| JP | 2012-039720 A | | 2/2012 |
| JP | 2013-094056 A | | 5/2013 |
| JP | 2014093893 A | * | 5/2014 |
| JP | 2015-061491 A | | 3/2015 |
| JP | 2018-093598 A | | 6/2018 |
| JP | 2018-129991 A | | 8/2018 |
| JP | 2018-143066 A | | 9/2018 |
| JP | 2019-103304 A | | 6/2019 |

\* cited by examiner

METHOD OF MANUFACTURING STATOR FOR ROTATING ELECTRIC MACHINE

CROSS-REFERENCE TO RELATED APPLICATION

This application is based on and claims priority from Japanese Patent Application No. 2019-189580 filed on Oct. 16, 2019, the contents of which are hereby incorporated by reference in their entirety into this application.

BACKGROUND

1 Technical Field

The present disclosure relates to apparatuses and methods for manufacturing stators for use in rotating electric machines.

2 Description of Related Art

There is known a stator for a rotating electric machine. The stator includes an annular stator core having a plurality of slots formed therein and a stator coil formed of coil segments (or electrical conductor segments) inserted in the slots of the stator core. Moreover, the stator also includes a pair of cuff supports (or insulating members) formed of a nonmagnetic material (e.g., resin) and arranged respectively on opposite axial sides of the stator core. The cuff supports are provided to fill gaps between axial end faces of the stator core and coil ends of the stator coil, thereby suppressing displacement of the coil ends relative to the stator core.

SUMMARY

According to the present disclosure, there is provided a first apparatus for manufacturing a stator for a rotating electric machine. The stator includes: an annular stator core formed of a plurality of steel sheets that are laminated in an axial direction of the stator core, the stator core having a plurality of teeth and a plurality of slots, the teeth each extending in a radial direction of the stator core and being arranged at predetermined intervals in a circumferential direction of the stator core, each of the slots being formed between one circumferentially-adjacent pair of the teeth; a stator coil formed of a plurality of coil segments inserted in the slots of the stator core; and a plurality of insulators inserted together with the coil segments in the slots of the stator core, the insulators being formed of a material that is foamable upon being heated. The first manufacturing apparatus includes: a placement table on which the stator core having the coil segments and the insulators inserted in the slots thereof is to be placed; a supporting member configured to support, in the axial direction of the stator core, distal end portions of the teeth of the stator core so as to prevent gaps from being formed between the steel sheets forming the stator core; and a resistance heating device configured to heat, through energization of the stator coil, the insulators along with the stator coil and thereby cause the insulators to foam.

According to the present disclosure, there is also provided a second apparatus for manufacturing a stator for a rotating electric machine. The stator includes: an annular stator core formed of a plurality of steel sheets that are laminated in an axial direction of the stator core, the stator core having a plurality of teeth and a plurality of slots, the teeth each extending in a radial direction of the stator core and being arranged at predetermined intervals in a circumferential direction of the stator core, each of the slots being formed between one circumferentially-adjacent pair of the teeth; a stator coil formed of a plurality of coil segments inserted in the slots of the stator core; and an impregnation material impregnated into the slots of the stator core and cured in the slots to fix the stator coil in the slots. The second manufacturing apparatus includes: a placement table on which the stator core having the coil segments inserted in the slots thereof is to be placed; a supporting member configured to support, in the axial direction of the stator core, distal end portions of the teeth of the stator core so as to prevent gaps from being formed between the steel sheets forming the stator core; an impregnation device configured to impregnate the impregnation material in a liquid state into the slots of the stator core; and a resistance heating device configured to heat, through energization of the stator coil, the impregnation material along with the stator coil and thereby cure the impregnation material in the slots.

According to the present disclosure, there is also provided a third apparatus for manufacturing a stator for a rotating electric machine. The stator includes: an annular stator core formed of a plurality of steel sheets that are laminated in an axial direction of the stator core, the stator core having a plurality of teeth and a plurality of slots, the teeth each extending in a radial direction of the stator core and being arranged at predetermined intervals in a circumferential direction of the stator core, each of the slots being formed between one circumferentially-adjacent pair of the teeth; a stator coil formed of a plurality of coil segments inserted in the slots of the stator core, the stator coil having a plurality of coil protruding parts which are parts of the coil segments protruding outside the slots from an axial end face of the stator core, the stator coil also having a plurality of coil joints at each of which distal end portions of a corresponding pair of the coil protruding parts are jointed together; and an encapsulating insulator having, at least, the coil joints of the stator coil encapsulated therein. The third manufacturing apparatus includes: a metal mold having a recess and a supporting portion, the recess being configured to have, at least, the coil joints of the stator coil inserted therein, the supporting portion being configured to support, in the axial direction of the stator core, distal end portions of the teeth of the stator core so as to prevent gaps from being formed between the steel sheets forming the stator core; a resin supply device configured to supply a liquid thermosetting resin for forming the encapsulating insulator into the recess of the metal mold; and a resistance heating device configured to heat, through energization of the stator coil with at least the coil joints of the stator coil immersed in the liquid thermosetting resin filled in the recess of the metal mold, the liquid thermosetting resin along with the stator coil and thereby set the liquid thermosetting resin to form the encapsulating insulator.

According to the present disclosure, there is also provided a first method of manufacturing a stator for a rotating electric machine. The first manufacturing method includes: a preparing step in which an annular stator core, coil segments for forming a stator coil and a plurality of insulators are prepared, the stator core being formed of a plurality of steel sheets that are laminated in an axial direction of the stator core, the stator core having a plurality of teeth and a plurality of slots, the teeth each extending in a radial direction of the stator core and being arranged at predetermined intervals in a circumferential direction of the stator core, each of the slots being formed between one circumferentially-adjacent pair of the teeth, the insulators being formed of a material that is foamable upon being heated; an insulator insertion step in which the insulators are respectively inserted into the slots of the stator core; a coil segment insertion step in which the coil segments are inserted into the slots of the stator core; a joining step in which the coil segments are joined to form the stator coil; a supporting step in which distal end portions of the teeth of the stator core are supported by a supporting member in the axial direction of the stator core, so as to prevent gaps from being formed between the steel sheets forming the stator core; and a resistance heating step in which the stator coil is energized to heat the insulators along with the stator coil and thereby cause the insulators to foam.

According to the present disclosure, there is also provided a second method of manufacturing a stator for a rotating electric machine. The second manufacturing method includes: a preparing step in which an annular stator core, coil segments for forming a stator coil and an impregnation material are prepared, the stator core being formed of a plurality of steel sheets that are laminated in an axial direction of the stator core, the stator core having a plurality of teeth and a plurality of slots, the teeth each extending in a radial direction of the stator core and being arranged at predetermined intervals in a circumferential direction of the stator core, each of the slots being formed between one circumferentially-adjacent pair of the teeth, the impregnation material being in a liquid state; a coil segment insertion step in which the coil segments are inserted into the slots of the stator core; a joining step in which the coil segments are joined to form the stator coil; a supporting step in which distal end portions of the teeth of the stator core are supported by a supporting member in the axial direction of the stator core, so as to prevent gaps from being formed between the steel sheets forming the stator core; an impregnation step in which the impregnation material in the liquid state is impregnated into the slots of the stator core; and a resistance heating step in which the stator coil is energized to heat the impregnation material along with the stator coil and thereby cure the impregnation material in the slots.

According to the present disclosure, there is also provided a third method of manufacturing a stator for a rotating electric machine. The third manufacturing method includes: a preparing step in which an annular stator core, coil segments for forming a stator coil and a liquid thermosetting resin for forming an encapsulating insulator are prepared, the stator core being formed of a plurality of steel sheets that are laminated in an axial direction of the stator core, the stator core having a plurality of teeth and a plurality of slots, the teeth each extending in a radial direction of the stator core and being arranged at predetermined intervals in a circumferential direction of the stator core, each of the slots being formed between one circumferentially-adjacent pair of the teeth; a coil segment insertion step in which the coil segments are inserted into the slots of the stator core so that parts of the coil segments protrude outside the slots from an axial end face of the stator core; a joining step in which the coil segments are joined to form the stator coil, the stator coil having a plurality of coil joints at each of which distal end portions of a corresponding pair of the protruding parts of the coil segments are joined together; a resin supply step in which the liquid thermosetting resin for forming the encapsulating insulator is supplied into a recess formed in a metal mold, the metal mold also having a supporting portion formed therein; an immersing step in which at least the coil joints of the stator coil are immersed in the liquid thermosetting resin filled in the recess of the metal mold while distal end portions of the teeth of the stator core are placed to be supported by the supporting portion of the metal mold in the axial direction of the stator core, so as to prevent gaps from being formed between the steel sheets forming the stator core; and a resistance heating step in which the stator coil is energized to heat the liquid thermosetting resin along with the stator coil and thereby set the liquid thermosetting resin to form the encapsulating insulator, the encapsulating insulator having, at least, the coil joints of the stator coil encapsulated therein.

DESCRIPTION OF EMBODIMENTS

Figure 1:
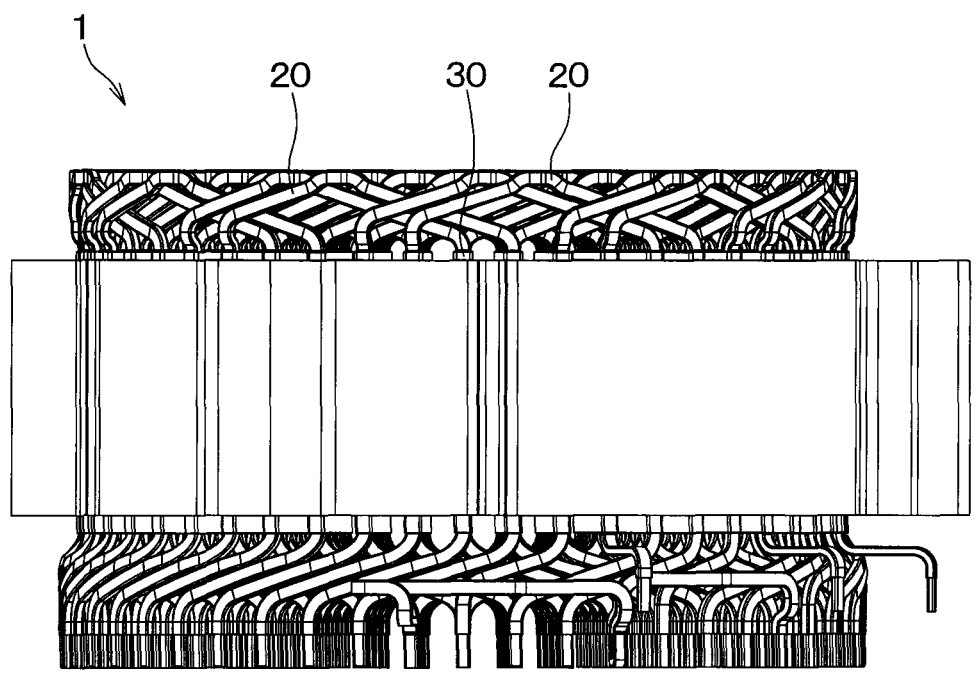
FIG. 1 is a side view of an intermediate product of a stator which is manufactured by a manufacturing apparatus and a manufacturing method according to a first embodiment.

The above-described stator known in the art (see, for example, Japanese Patent Application Publication No. JP 2018-143066 A) has the pair of cuff supports arranged respectively on opposite axial sides of the stator core, increasing the axial dimension of the stator. Therefore, in terms of minimizing the axial dimension of the stator, it is desirable to eliminate the cuff supports from the stator.

However, the inventors of the present application have found, through investigation, that elimination of the cuff supports from the stator may cause the following problems during the manufacture of the stator.

That is, in manufacturing the stator, DRH (Direct Resistance Heating) may be performed in such a manner as to energize the stator coil (or the coil segments) and thereby heat the stator coil and other members around the stator coil. However, when DRH is performed on the stator from which the cuff supports are eliminated, steel sheets, which are laminated in the axial direction of the stator core to form the stator core, may spread in the axial direction under the repelling force between portions of the steel sheets which are located adjacent to one another in the axial direction and magnetized into the same polarity during the DRH.

Moreover, the stator may further include insulators that are formed of a foamable material and inserted respectively in the slots of the stator core. In this case, when the DRH is performed to cause the insulators to foam, if the steel sheets forming the stator core spread in the axial direction during the DRH, the foamable material of which the insulators are formed may intrude between the steel sheets, forming gaps between the steel sheets.

Alternatively, the stator may further have an impregnation material (e.g., varnish) impregnated into the slots of the stator core. In this case, when the DRH is performed to cure (or harden) the impregnation material, if the steel sheets forming the stator core spread in the axial direction during the DRH, the impregnation material may intrude between the steel sheets, forming gaps between the steel sheets.

Consequently, in either of the above cases, with the gaps formed between the steel sheets, NV (Noise and Vibration) may occur during operation of a rotating electric machine that includes the stator.

In contrast, with the configuration of the first manufacturing apparatus according to the present disclosure, it is possible to support, during the heating of the insulators by the resistance heating device, the distal end portions of the teeth of the stator core in the axial direction of the stator core by the supporting member. Consequently, it is possible to prevent the steel sheets forming the stator core from spreading in the axial direction of the stator core during the heating of the insulators by the resistance heating device. Accordingly, it is also possible to prevent the material of the insulators from intruding between the steel sheets. As a result, it is possible to prevent NV from occurring during operation of the rotating electric machine that includes the stator.

With the configuration of the second manufacturing apparatus according to the present disclosure, it is possible to support, during the heating of the impregnation material by the resistance heating device, the distal end portions of the teeth of the stator core in the axial direction of the stator core by the supporting member. Consequently, it is possible to prevent the steel sheets forming the stator core from spreading in the axial direction of the stator core during the heating of the impregnation material by the resistance heating device. Accordingly, it is also possible to prevent the impregnation material from intruding and curing between the steel sheets. As a result, it is possible to prevent NV from occurring during operation of the rotating electric machine that includes the stator.

With the configuration of the third manufacturing apparatus according to the present disclosure, it is possible to support, during the heating of the liquid thermosetting resin by the resistance heating device, the distal end portions of the teeth of the stator core in the axial direction of the stator core by the supporting portion of the metal mold. Consequently, it is possible to prevent the steel sheets forming the stator core from spreading in the axial direction of the stator core during the heating of the liquid thermosetting resin by the resistance heating device. Accordingly, it is also possible to prevent insulators, which have been foamed and cured in the slots of the stator core, from being detached from the stator core due to spreading of the steel sheets in the axial direction. As a result, no detached parts of the insulators will scatter in the rotating electric machine that includes the stator.

With the first manufacturing method according to the present disclosure, it is possible to heat the insulators with the distal end portions of the teeth of the stator core supported by the supporting member in the axial direction of the stator core. Consequently, it is possible to prevent the steel sheets forming the stator core from spreading in the axial direction of the stator core in the resistance heating step. Accordingly, it is also possible to prevent the material of the insulators from intruding between the steel sheets. As a result, it is possible to prevent NV from occurring during operation of the rotating electric machine that includes the stator.

With the second manufacturing method according to the present disclosure, it is possible to heat the impregnation material with the distal end portions of the teeth of the stator core supported by the supporting member in the axial direction of the stator core. Consequently, it is possible to prevent the steel sheets forming the stator core from spreading in the axial direction of the stator core in the resistance heating step. Accordingly, it is also possible to prevent the impregnation material from intruding and curing between the steel sheets. As a result, it is possible to prevent NV from occurring during operation of the rotating electric machine that includes the stator.

With the third manufacturing method according to the present disclosure, it is possible to heat the liquid thermosetting resin for forming the encapsulating insulator with the distal end portions of the teeth of the stator core supported by the supporting portion of the metal mold in the axial direction of the stator core. Consequently, it is possible to prevent the steel sheets forming the stator core from spreading in the axial direction of the stator core in the resistance heating step. Accordingly, it is also possible to prevent insulators, which have been foamed and cured in the slots of the stator core in a preceding insulator heating step, from being detached from the stator core due to spreading of the steel sheets in the axial direction. As a result, no detached parts of the insulators will scatter in the rotating electric machine that includes the stator.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, descriptions of identical components will not be repeated.

First Embodiment

A stator 1, which is manufactured by a manufacturing apparatus and a manufacturing method according to the first embodiment, is for use in a rotating electric machine. The rotating electric machine includes the stator 1 and a rotor (not shown) that is rotatably arranged radially inside the stator 1. In addition, the rotating electric machine may be configured as an electric motor, an electric generator or a motor-generator that selectively functions either as an electric motor or as an electric generator.

Figure 2:
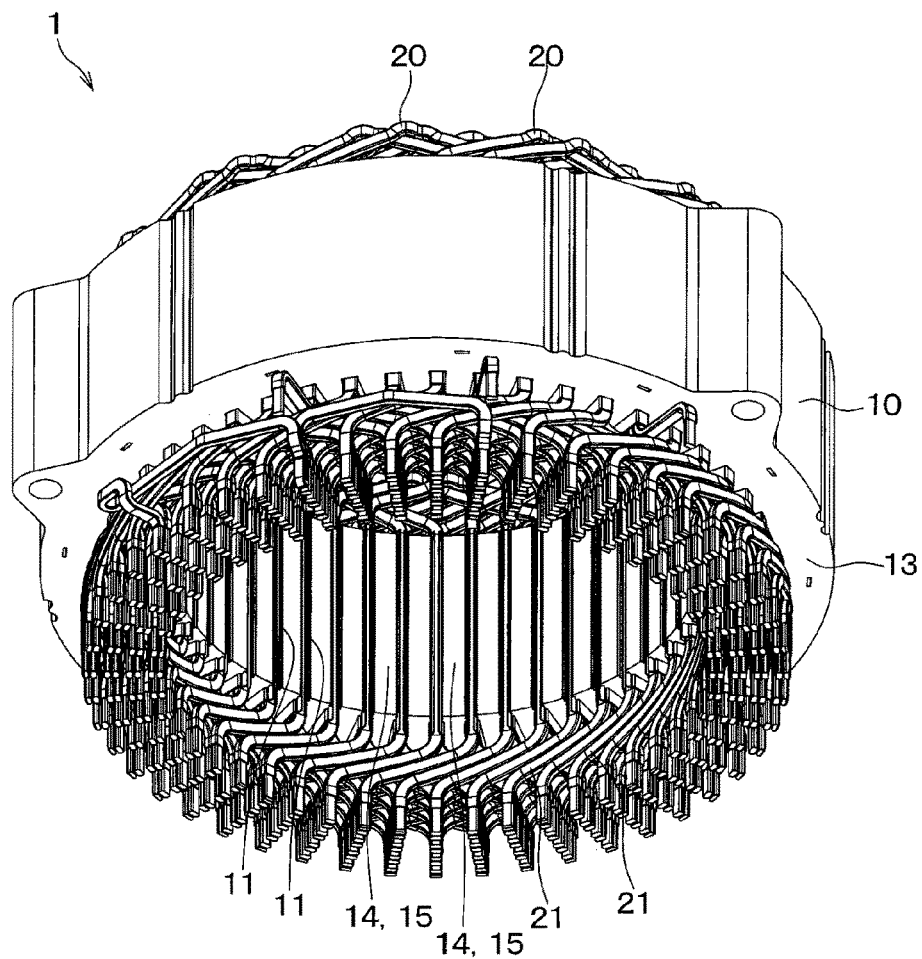
FIG. 2 is a perspective view of the intermediate product of the stator manufactured by the manufacturing apparatus and the manufacturing method according to the first embodiment.
Figure 3:
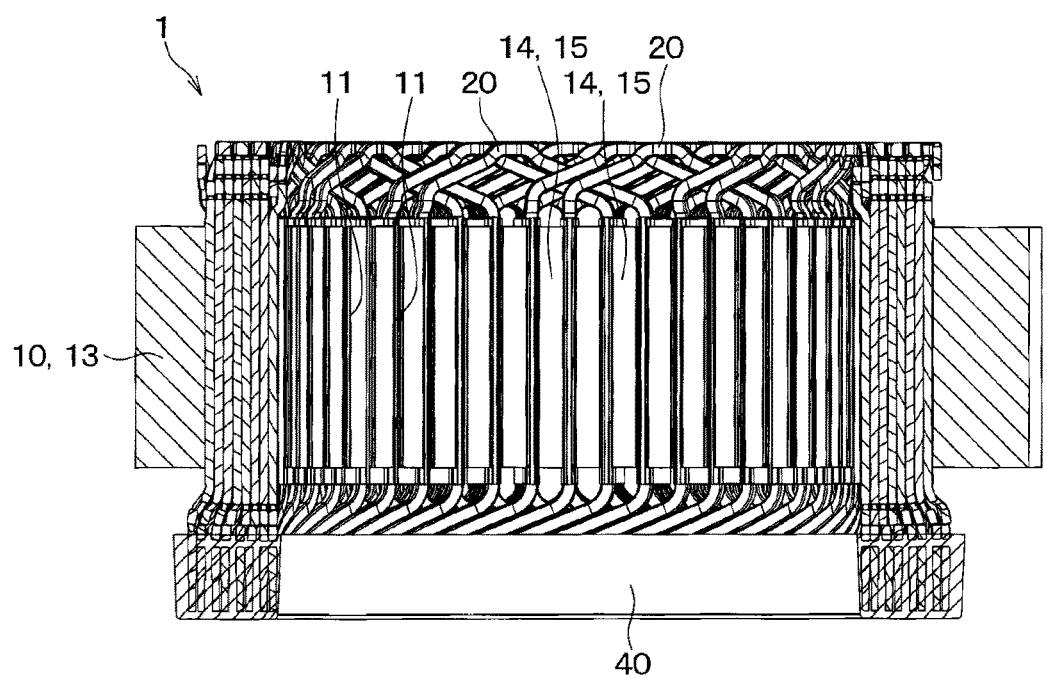
FIG. 3 is a cross-sectional view of the stator manufactured by the manufacturing apparatus and the manufacturing method according to the first embodiment.

FIGS. 1 and 2 show an intermediate product of the stator 1, while FIG. 3 shows the finally-obtained (or finished) stator 1.

As shown in FIGS. 1-3, the stator 1 includes an annular stator core 10 having a plurality of slots 11 formed therein, a stator coil formed of a plurality of coil segments (or electrical conductor segments) 20 inserted in the slots 11 of the stator core 10, and a plurality of insulators 30 inserted together with the coil segments 20 in the slots 11. It should be noted that only those parts of the insulators 30 which protrude outside the slots 11 of the stator core 10 are shown in FIG. 1.

The stator core 10 includes an annular back core 13, a plurality of teeth 14 that each extend radially inward from the back core 13 and are arranged at predetermined intervals in a circumferential direction of the stator core 10 (i.e., circumferential direction of the back core 13), and the slots 11 each of which is formed between one circumferentially-adjacent pair of the teeth 14.

Figure 15:
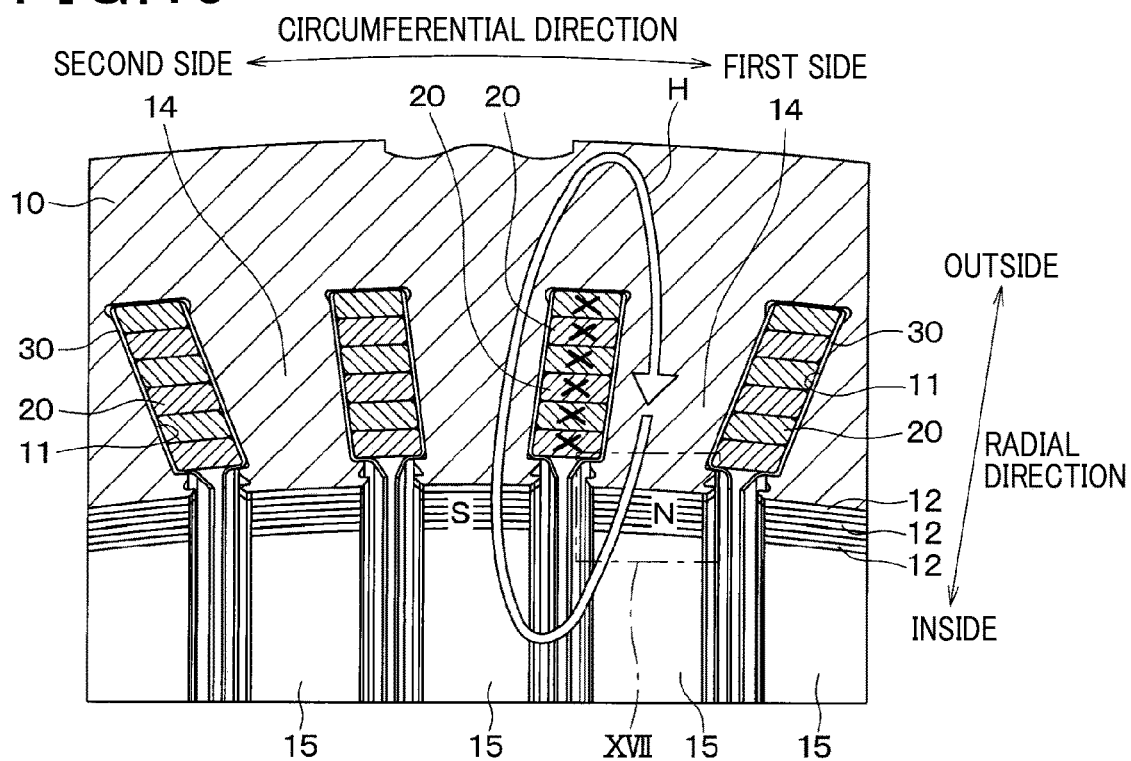
FIG. 15 is a schematic perspective view illustrating the cause of a phenomenon where steel sheets, which are laminated in an axial direction of a stator core of the stator to form the stator core, spread in the axial direction when DRH is performed on the stator.
Figure 17:
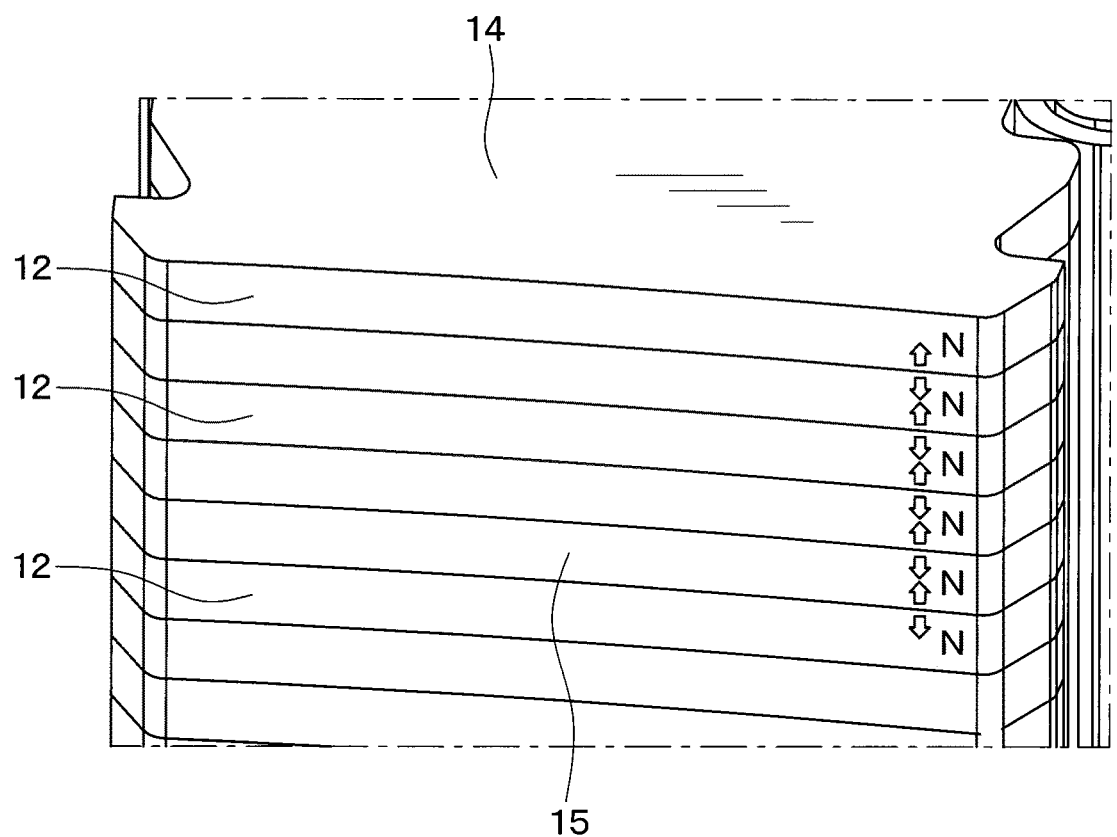
FIG. 17 is an enlarged view of the part XVII in FIG. 15.

In the present embodiment, the stator core 10 is formed of a plurality of annular steel sheets 12 that are laminated in an axial direction of the stator core 10 (see FIGS. 15 and 17). The steel sheets 12 may be formed of, for example, magnetic steel. In addition, the steel sheets 12 have a thickness of, for example, 0.25 mm.

Each of the coil segments 20 is substantially U-shaped to have a pair of straight portions extending parallel to each other and a turn portion connecting ends of the straight portions on the same side. The straight portions are respectively inserted in two corresponding slots 11 of the stator core 10 such that parts of the straight portions axially protrude outside the corresponding slots 11 from a first axial end face (i.e., the lower end face in FIGS. 1-3) of the stator core 10. That is, each of the coil segments 20 has a pair of protruding parts 21 that axially protrude outside the corresponding slots 11 from the first axial end face of the stator core 10. The protruding parts 21 are then bent in the circumferential direction of the stator core 10 so as to extend obliquely with respect to the first axial end face of the stator core 10. Hereinafter, the protruding parts 21 of the coil segments 20 will be simply referred to as coil protruding parts 21. All the coil protruding parts 21 together constitute a first coil end of the stator coil.

In addition, each of the coil segments 20 has its turn portion protruding outside the corresponding slots 11 from a second axial end face (i.e., the upper end face in FIGS. 1-3) of the stator core 10. All the turn portions of the coil segments 20 together constitute a second coil end of the stator coil.

In the present embodiment, the coil segments 20 are obtained by cutting and plastically deforming an electric wire that includes an electrical conductor and an insulating coat. The electrical conductor is formed of an electrically conductive material (e.g., copper) and has a substantially rectangular cross-sectional shape. The insulating coat is formed of an electrically insulative material (e.g., enamel) and provided to cover the outer surface of the electrical conductor.

Moreover, the insulating coat is removed from distal end portions of the coil protruding parts 21. Each radially-adjacent pair of the distal end portions of the coil protruding parts 21 are joined, for example by welding, to form a joint 22 (see FIGS. 19-21) therebetween. Consequently, all the coil segments 20 are electrically connected together to form the stator coil which is a three-phase coil either Y-connected or Δ-connected. In addition, the joints 22 formed between the distal end portions of the coil protruding parts 21 will be simply referred to as coil joints 22 hereinafter.

As shown in FIG. 3, in the finally-obtained stator 1, the coil joints 22 and those portions of the coil protruding parts 21 which are immediately adjacent to the coil joints 22 are encapsulated by an encapsulating insulator 40. The encapsulating insulator 40 is formed of, for example, a thermosetting resin. In addition, unlike the above-described stator known in the art (see, for example, Japanese Patent Application Publication No. JP 2018-143066 A), the stator 1 according to the present embodiment includes no cuff support.

Next, the manufacturing apparatus and the manufacturing method according to the present embodiment will be described with reference to FIGS. 4-21.

Figure 4:
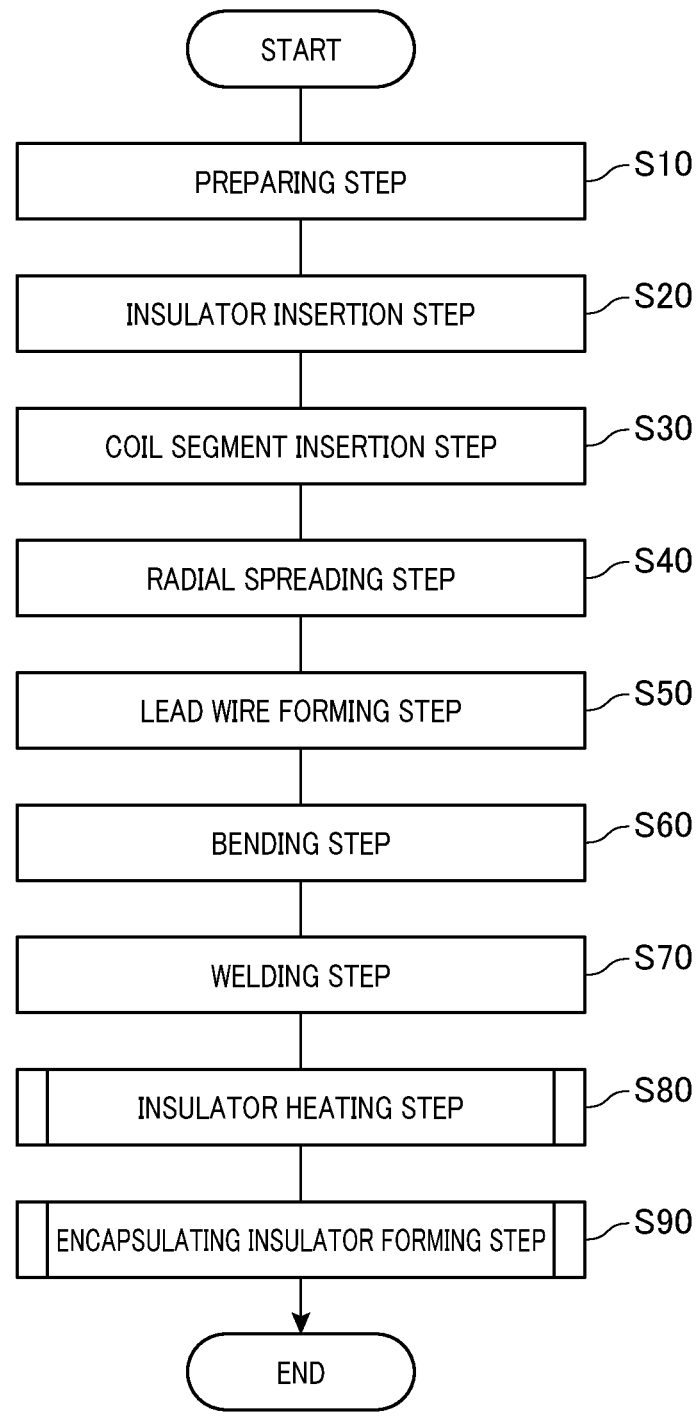
FIG. 4 is a flowchart illustrating the manufacturing method according to the first embodiment.

FIG. 4 is a flowchart illustrating the outline of the manufacturing method according to the present embodiment.

As shown in FIG. 4, the manufacturing method includes a preparing step S10, an insulator insertion step S20, a coil segment insertion step S30, a radial spreading step S40, a lead wire forming step S50, a bending step S60, a welding step S70, an insulator heating step S80 and an encapsulating insulator forming step S90.

First, in the preparing step S10, the stator core 10, the coil segments 20 for forming the stator coil, and the insulators 30 are prepared.

In the insulator insertion step S20, the insulators 30 are respectively inserted into the corresponding slots 11 of the stator core 10. Consequently, the insulators 30 are respectively located inside the interior walls of the stator core 10 defining the corresponding slots 11. In addition, in the present embodiment, the insulators 30 are formed of, for example, a curable and foamable resin that is foamed and cured upon being heated.

In the coil segment insertion step S30, the coil segments 20 are inserted into the corresponding slots 11 of the stator core 10. Consequently, in each of the slots 11 of the stator core 10, between the interior wall of the stator core 10 defining the slot 11 and the corresponding coil segments 20 inserted in the slot 11, there is interposed the corresponding insulator 30 inserted in the slot 11.

More specifically, in this step, for each of the substantially U-shaped coil segments 20, the two straight portions of the coil segment 20 are respectively inserted into two corresponding slots 11 of the stator core 10 which are located away from each other by one magnetic pole pitch. Consequently, parts of the straight portions axially protrude outside the corresponding slots 11 from the first axial end face (i.e., the lower end face in FIGS. 1-3) of the stator core 10. Each of the protruding parts of the straight portions constitutes one of the coil protruding parts 21. In addition, in each of the slots 11 of the stator core 10, the straight portions of the coil segments 20 are arranged in radial alignment with each other (see FIG. 7). Accordingly, for each of the slots 11 of the stator core 10, those coil protruding parts 21 which protrude outside from the slot 11 are also arranged in radial alignment with each other.

Figure 7:
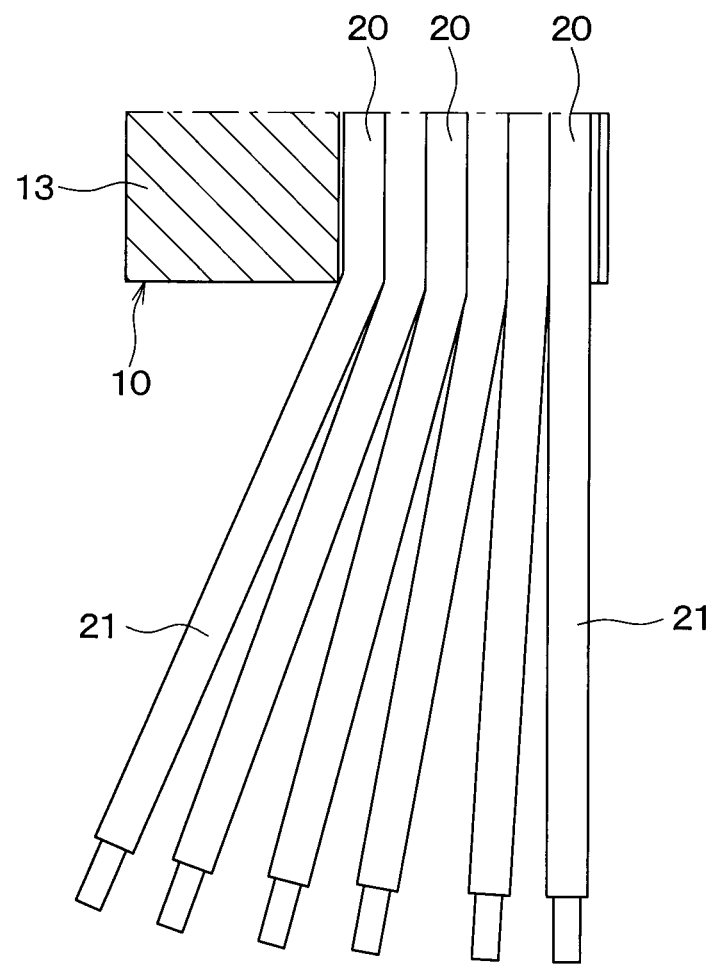
FIG. 7 is a partially cross-sectional view showing coil protruding parts after being deformed to radially spread in a radial spreading step of the manufacturing method according to the first embodiment.
Figure 8:
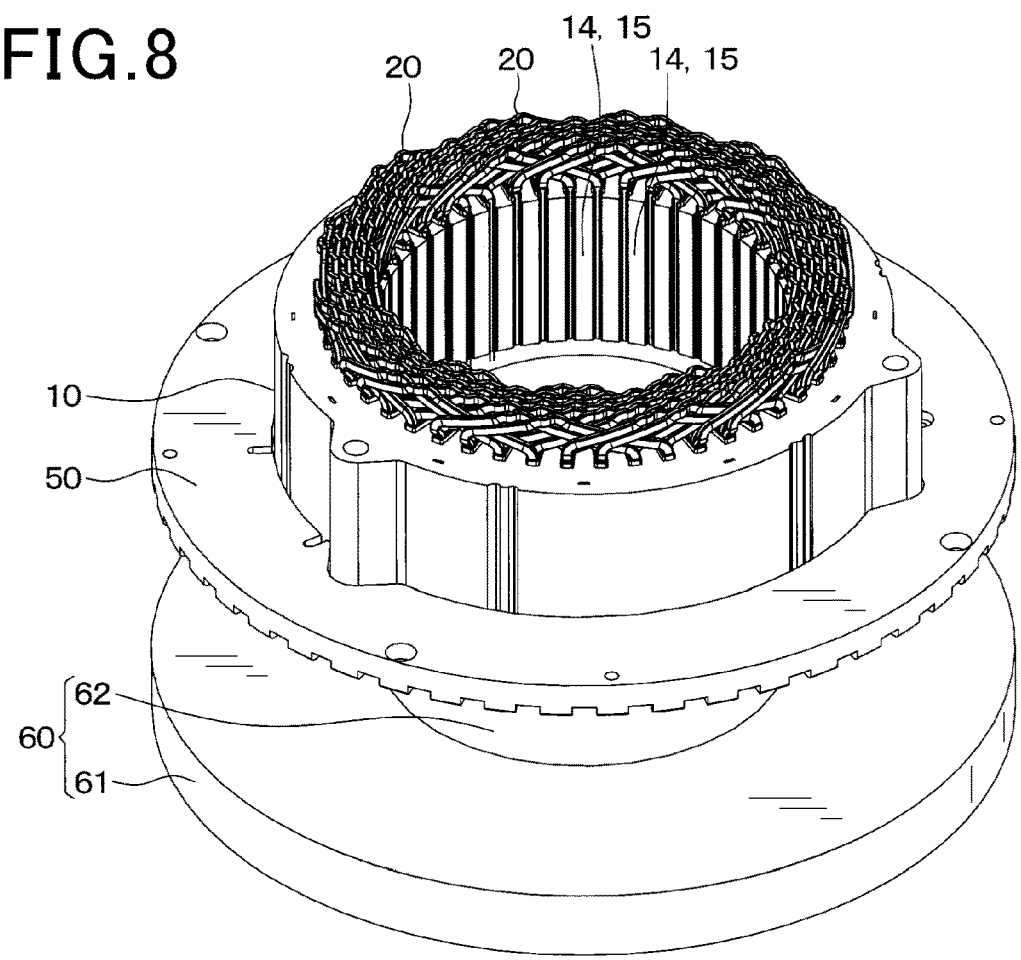
FIG. 8 is a perspective view showing both a placement table and a supporting member of the manufacturing apparatus according to the first embodiment.
Figure 9:
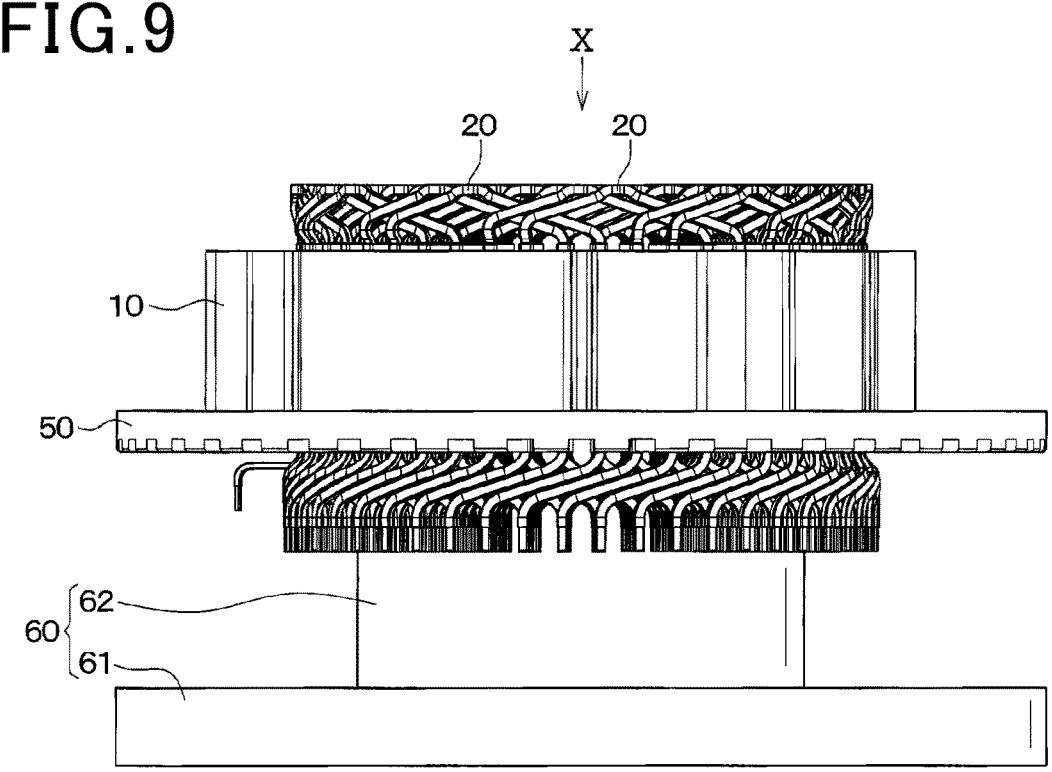
FIG. 9 is a side view showing both the placement table and the supporting member of the manufacturing apparatus according to the first embodiment.
Figure 10:
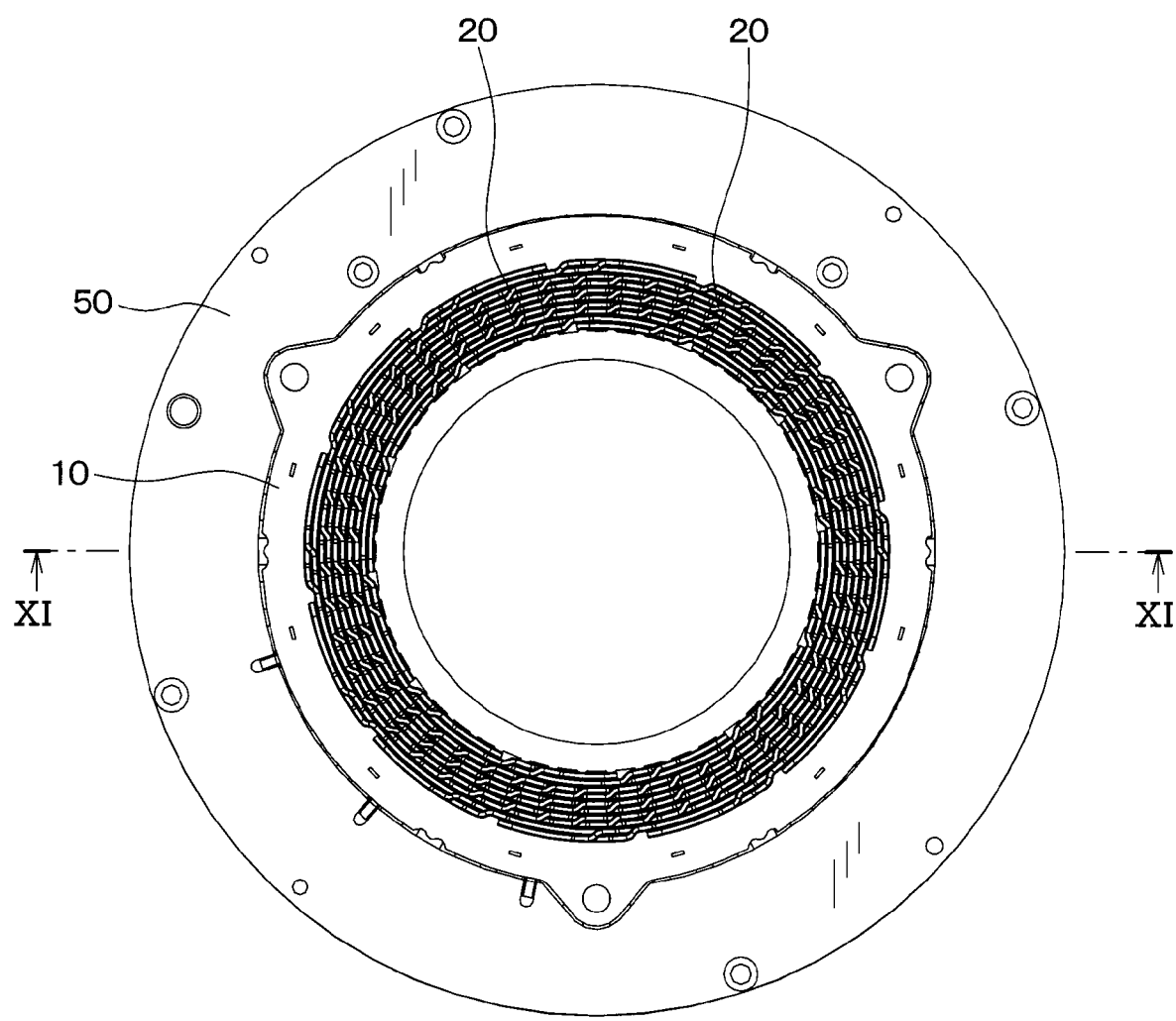
FIG. 10 is a plan view along the direction X in FIG. 9.

In the radial spreading step S40, the coil protruding parts 21 are deformed to radially spread. Consequently, as shown in FIG. 7, between each radially-adjacent pair of the coil protruding parts 21, there is formed a predetermined gap.

In the lead wire forming step S50, lead wires 23 (see FIG. 14) of the three-phase stator coil are formed into predetermined shapes. More specifically, each of the lead wires 23 is formed by plastically deforming a given one of the coil protruding parts 21. Moreover, the lead wires 23 are formed at predetermined positions where they can be respectively connected to ends of power lines (not shown) through which three-phase AC power is supplied to the stator coil.

In the bending step S60, the coil protruding parts 21 are bent in the circumferential direction of the stator core 10 so as to extend obliquely with respect to the first axial end face of the stator core 10. Consequently, each of the coil protruding parts 21 has its distal end portion (i.e., exposed portion) located radially adjacent to or radially abutting the distal end portion (i.e., exposed portion) of another of the coil protruding parts 21.

In the welding step S70, each radially-adjacent or radially-abutting pair of the distal end portions (i.e., exposed portions) of the coil protruding parts 21 are welded to form a weld (i.e., coil joint 22) therebetween. Consequently, all the coil segments 20 are electrically connected together to form the three-phase stator coil.

In the insulator heating step S80, the insulators 30 are heated by both IH (Induction Heating) and DRH (Direct Resistance Heating). As described above, in the present embodiment, the insulators 30 are formed of the curable and foamable resin. Therefore, upon being heated in this step, the insulators 30 are foamed and cured. Consequently, the vacant spaces in the slots 11 of the stator core 10 are filled with the insulators 30, thereby fixing the coil segments 20 in the slots 11.

The insulator heating step S80 will be described in more detail hereinafter with reference to FIGS. 5 and 8-17.

Figure 5:
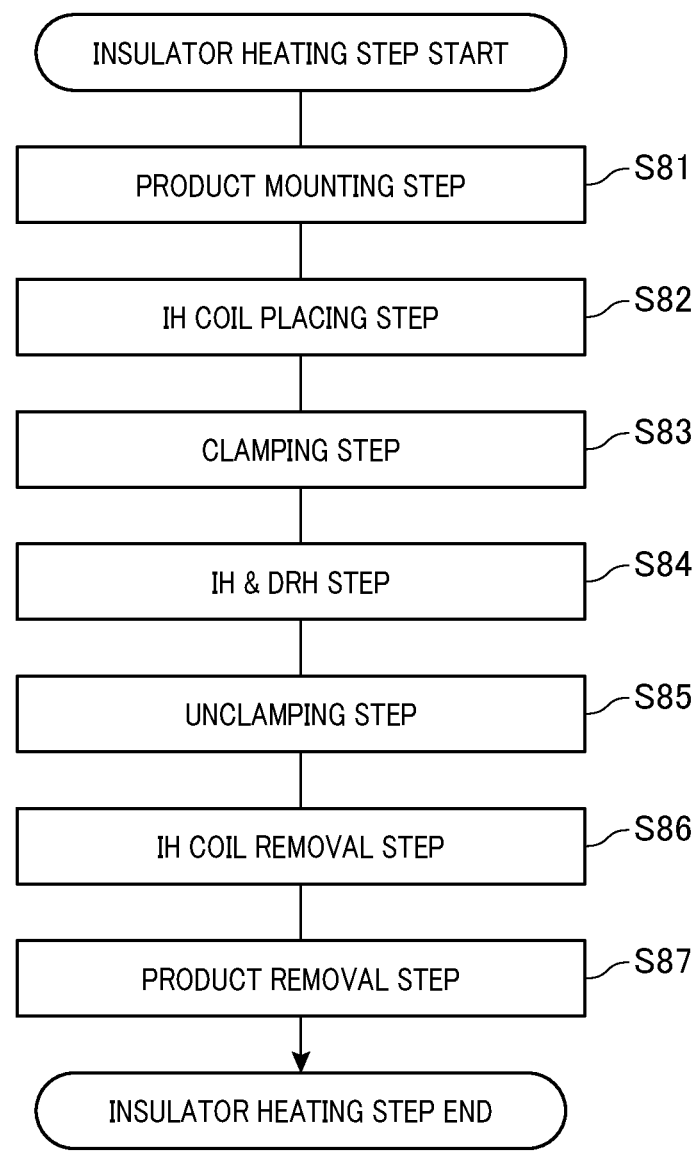
FIG. 5 is a flowchart illustrating an insulator heating step of the manufacturing method according to the first embodiment.

FIG. 5 is a flowchart illustrating the outline of the insulator heating step S80. As shown in FIG. 5, the insulator heating step S80 includes a product mounting step S81, an IH coil placing step S82, a clamping step S83, an IH and DRH step S84, an unclamping step S85, an IH coil removal step S86, and a product removal step S87.

In the product mounting step S81, an intermediate product of the stator 1, which is obtained as a result of performing the above-described steps S10-S70 of the manufacturing method, is mounted to an insulator heating apparatus.

Specifically, as shown in FIGS. 8-14, the insulator heating apparatus, which constitutes part of the manufacturing apparatus for manufacturing the stator 1 according to the present embodiment, includes a placement table 50, a supporting member 60, an IH coil 70 and a DRH device 80.

Figure 11:
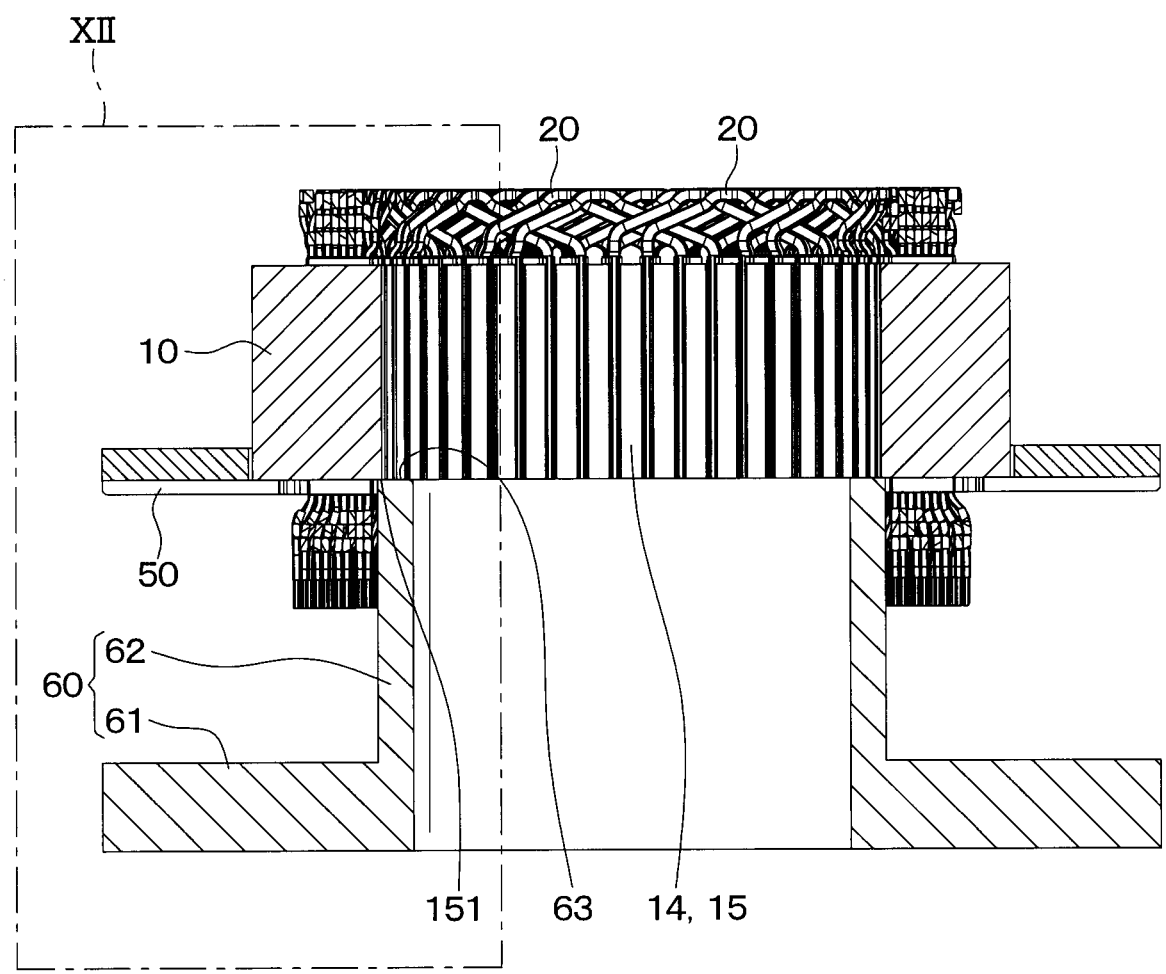
FIG. 11 is a partially cross-sectional view taken along the line XI-XI in FIG. 10.
Figure 12:
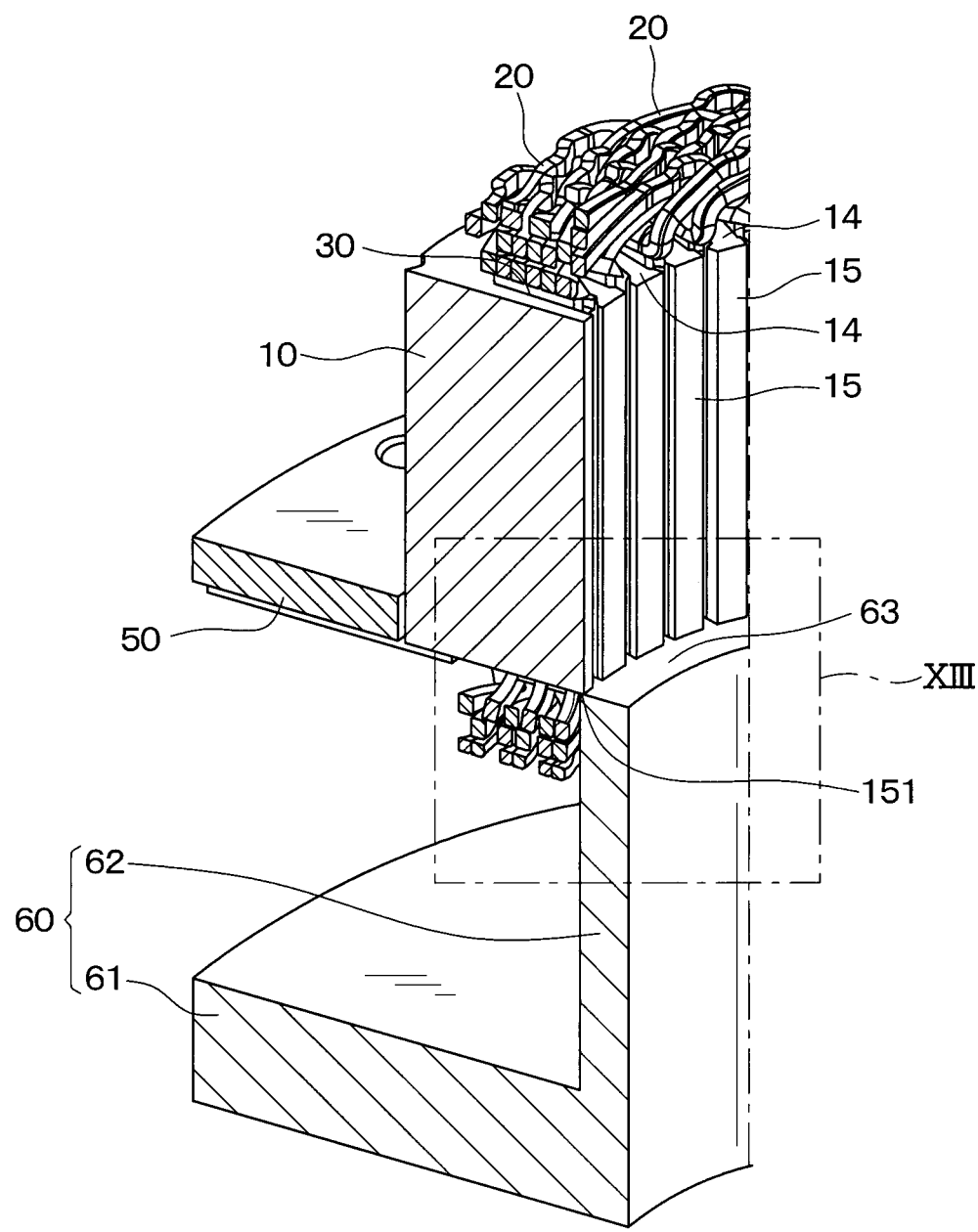
FIG. 12 is a perspective view of the part XII in FIG. 11.

The placement table 50 is substantially annular in shape. In the product mounting step S81, a radially outer part of the stator core 10 is placed on the placement table 50. More specifically, as shown in FIGS. 11 and 12, a vertically lower surface of the radially outer part of the stator core 10 is placed on the placement table 50.

Figure 13:
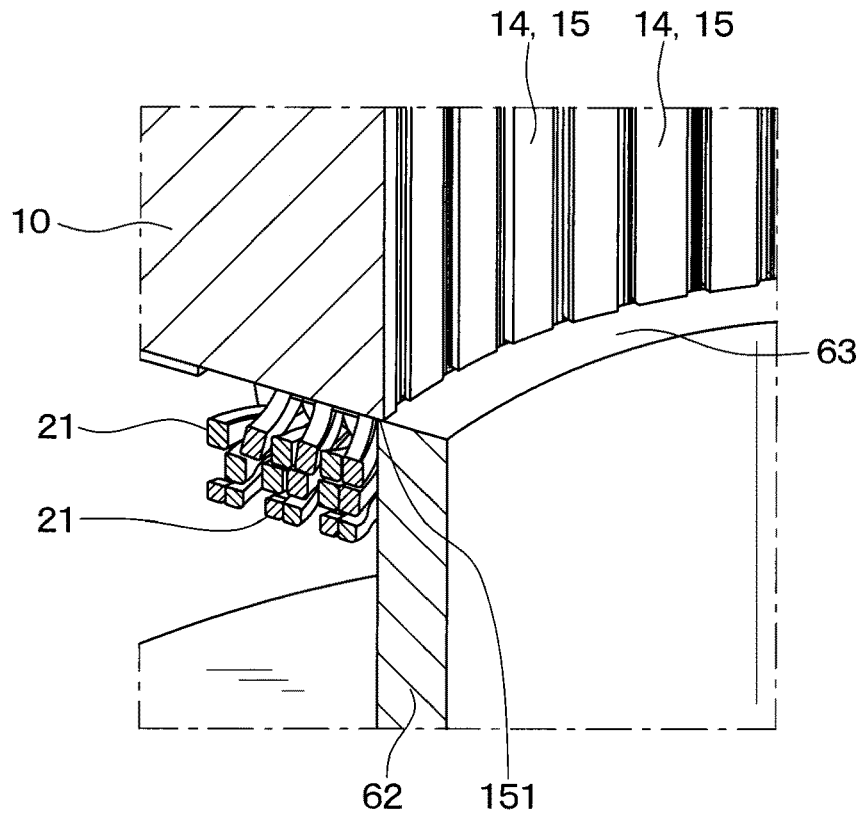
FIG. 13 is an enlarged view of the part XIII in FIG. 12.

The supporting member 60 has an annular base portion 61 and a cylindrical portion 62 axially extending from a radially inner peripheral part of the base portion 61. As shown in FIGS. 12 and 13, the cylindrical portion 62 of the supporting member 60 is configured to support, in the axial direction of the stator core 10, distal end portions (i.e., radially inner end portions in the present embodiment) 15 of the teeth 14 of the stator core 10. Hereinafter, the distal end portions 15 of the teeth 14 will be simply referred to as tooth end portions 15. More specifically, the cylindrical portion 62 of the supporting member 60 supports the tooth end portions 15 with a vertically upper end face 63 of the cylindrical portion 62 abutting vertically lower surfaces 151 of the tooth end portions 15.

Consequently, it becomes possible for the supporting member 60 to support the tooth end portions 15 in the axial direction of the stator core 10 so as to prevent gaps from being formed between the steel sheets 12 forming the stator core 10. In addition, the product mounting step S81 in the present embodiment corresponds to a "supporting step".

Figure 14:
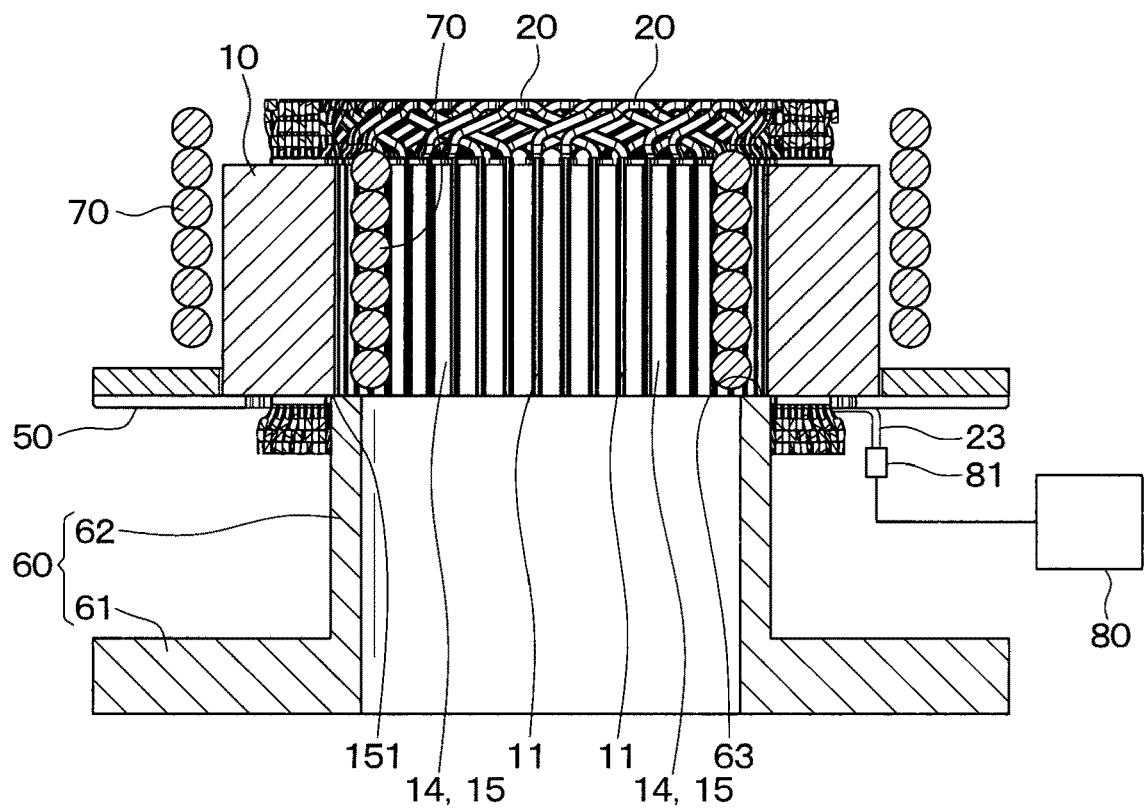
FIG. 14 is a cross-sectional view showing the placement table, the supporting member, an IH (Induction Heating) coil and a DRH (Direct Resistance Heating) device of the manufacturing apparatus according to the first embodiment.

In the IH coil placing step S82, as shown in FIG. 14, the IH coil 70 is placed on both the radially outer and radially inner sides of the stator core 10.

More specifically, in this step, the IH coil 70 is moved downward, from the vertically upper side of the stator core 10, to a position where it radially faces the stator core 10 from both the radially outer and radially inner sides of the stator core 10. Here, the IH coil 70 is provided to heat the stator core 10 through electromagnetic induction, thereby heating the insulators 30 inserted in the slots 11 of the stator core 10 to foam.

In the clamping step S83, as shown in FIG. 14, the lead wires 23 of the stator coil are clamped by corresponding terminals 81 of the DRH device 80. Here, the DRH device 80 is provided to heat the stator coil through energization of the stator coil (or supply of electric current to the stator coil), thereby heating the insulators 30, which are inserted together with the coil segments 20 in the slots 11 of the stator core 10, to foam.

In the IH and DRH step S84, both IH (Induction Heating) and DRH (Direct Resistance Heating) are performed on the intermediate product of the stator 1.

More specifically, in this step, the IH is performed by energizing the IH coil 70, thereby heating the stator core 10 through electromagnetic induction; thus the insulators 30 are also heated by heat transmitted from the stator core 10. At the same time, the DRH is performed by energizing the stator coil, causing the stator coil to be heated due to its resistance to the electric current; thus the insulators 30 are also heated by heat transmitted from the stator coil.

Consequently, upon being heated by both the IH and the DRH, the insulators 30 foam to fill vacant spaces in the slots 11 of the stator core 10, thereby fixing the stator coil (i.e., the coil segments 20) in the slots 11.

As above, in the present embodiment, the insulators 30 are heated by both the IH and the DRH, thus reducing the time required to increase the temperature of the insulators 30 to the foaming temperature thereof and thereby improving the productivity. However, it should be noted that the insulators 30 may alternatively be heated by only one of the IH and the DRH.

Moreover, as mentioned previously, the stator 1 according to the present embodiment includes no cuff support. Therefore, if the tooth end portions 15 were not supported by the supporting member 60 during the DRH, a phenomenon might occur in which the steel sheets 12 forming the stator core 10 spread in the axial direction of the stator core 10. The cause of the phenomenon will be described hereinafter with reference to FIGS. 15-17.

In FIG. 15, the symbol "x" marked on the coil segments 20 inserted in the corresponding slots 11 of the stator core 10 represents that during the DRH, electric current flows through the coil segments 20 in the direction from the upper side to the lower side in FIG. 15. Moreover, in FIG. 16, the symbol "x" marked on the coil segments 20 represents that during the DRH, electric current flows through the coil segments 20 in the direction into the plane of the paper.

Figure 16:
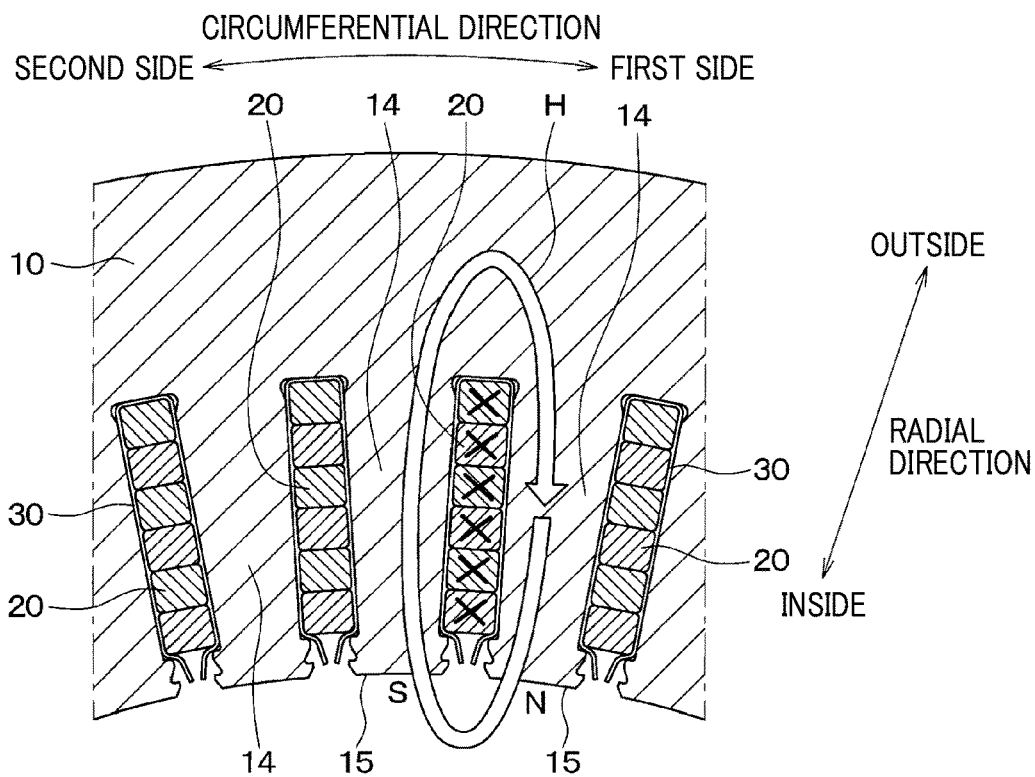
FIG. 16 is a schematic cross-sectional view illustrating the cause of the phenomenon where the steel sheets spread in the axial direction when DRH is performed on the stator.

Energizing the coil segments 20 in the direction as described above, magnetic field will be created in a direction indicated by an arrow H in FIG. 16. The magnetic field will magnetize the tooth end portion 15 located on a first circumferential side of the coil segments 20 marked with the symbol "x" into an N pole while magnetizing the tooth end portion 15 located on a second circumferential side of the coil segments 20 marked with the symbol "x" into an S pole. Consequently, as shown in FIG. 17, at each of the tooth end portions 15 of the stator core 10, all of the steel sheets 12 forming the stator core 10 will have the same polarity and thus will repel one another. As a result, the steel sheets 12 may spread in the axial direction of the stator core 10, forming gaps therebetween.

To prevent occurrence of the above phenomenon, in the present embodiment, the tooth end portions 15 are supported by the supporting member 60 in the axial direction of the stator core 10 during the DRH. Consequently, the steel sheets 12 forming the stator core 10 are prevented from spreading in the axial direction of the stator core 10 during the DRH. As a result, it becomes possible to prevent the material of the insulators 30 (i.e., the curable and foamable resin) from intruding between the steel sheets 12.

Upon completion of the IH and DRH step S84, the lead wires 23 of the stator coil are unclamped from the corresponding terminals 81 of the DRH device 80 in the unclamping step S85.

In the IH coil removal step S86, the IH coil 70 is removed from the stator core 10. More specifically, the IH coil 70 is moved upward, returning to its initial position.

In the product removal step S87, the intermediate product of the stator 1 is removed from the insulator heating apparatus.

Upon completion of all of the steps S81-S87 shown in FIG. 5, the insulator heating step S80 terminates.

Referring back to FIG. 4, in the encapsulating insulator forming step S90, the coil joints 22 and those portions of the coil protruding parts 21 which are immediately adjacent to the coil joints 22 are encapsulated by the encapsulating insulator 40.

The encapsulating insulator forming step S90 will be described in more detail hereinafter with reference to FIGS. 6 and 18-21.

Figure 6:
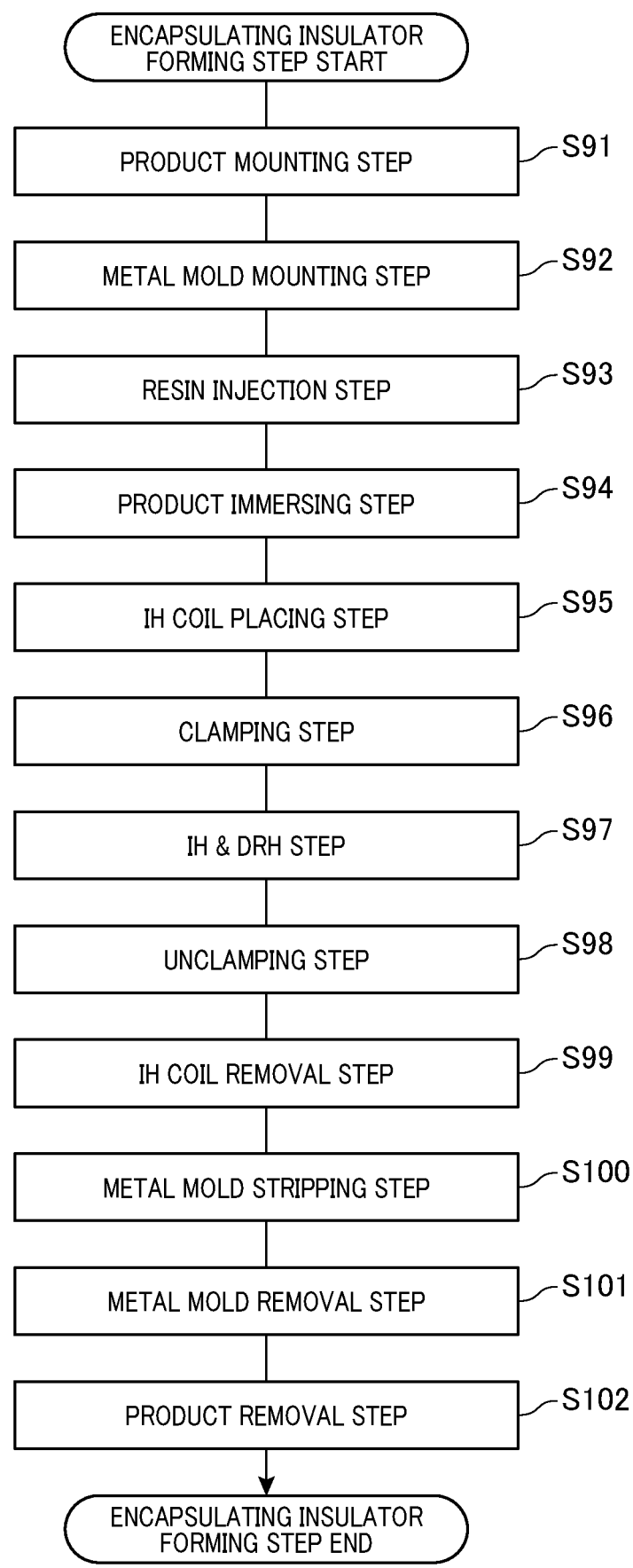
FIG. 6 is a flowchart illustrating an encapsulating insulator forming step of the manufacturing method according to the first embodiment.

FIG. 6 is a flowchart illustrating the outline of the encapsulating insulator forming step S90. As shown in FIG. 6, the encapsulating insulator forming step S90 includes a product mounting step S91, a metal mold mounting step S92, a resin injection step S93, a product immersing step S94, an IH coil placing step S95, a clamping step S96, an IH and DRH step S97, an unclamping step S98, an IH coil removal step S99, a metal mold stripping step S100, a metal mold removal step S101 and a product removal step S102.

In the product mounting step S91, the intermediate product of the stator 1, which is obtained as a result of performing the above-described steps S10-S80 of the manufacturing method, is mounted to an encapsulating insulator forming apparatus. In addition, the encapsulating insulator forming apparatus also constitutes part of the manufacturing apparatus for manufacturing the stator 1 according to the present embodiment.

In the metal mold mounting step S92, a metal mold 90 is mounted to the encapsulating insulator forming apparatus.

Figure 18:
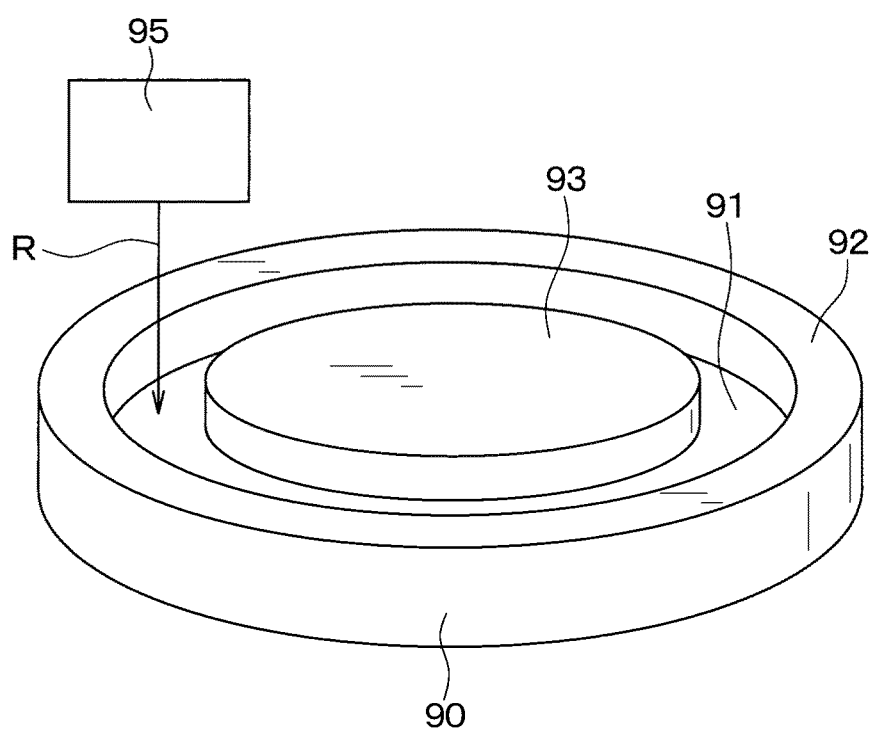
FIG. 18 is a perspective view showing both a metal mold and a resin supply device of the manufacturing apparatus according to the first embodiment.

As shown in FIG. 18, the metal mold 90 is substantially disc-shaped. The metal mold 90 has an annular recess 91 formed in a vertically upper surface thereof. The shape and size of the recess 91 are set so as to allow the coil joints 22 and those portions of the coil protruding parts 21 which are immediately adjacent to the coil joints 22 to be inserted in the recess 91. Moreover, the shape and size of the upper surface of the metal mold 90 are set so as to allow the stator core 10 to be placed on the upper surface. The upper surface of the metal mold 90 includes a first part 92 located radially outside the recess 91 and a second part 93 located radially inside the recess 91. Hereinafter, the first and second parts of the upper surface of the metal mold 90 will be simply referred to as the radially-outer upper surface 92 and the radially-inner upper surface 93, respectively.

In the resin injection step S93, a liquid thermosetting resin for forming the encapsulating insulator 40 is injected into the recess 91 of the metal mold 90. More specifically, as indicated by an arrow R in FIG. 18, the liquid thermosetting resin, which is supplied from a resin supply device 95, is injected into the recess 91 of the metal mold 90.

In the product immersing step S94, the coil joints 22 and those portions of the coil protruding parts 21 which are immediately adjacent to the coil joints 22 are immersed in the liquid thermosetting resin filled in the recess 91 of the metal mold 90.

Figure 19:
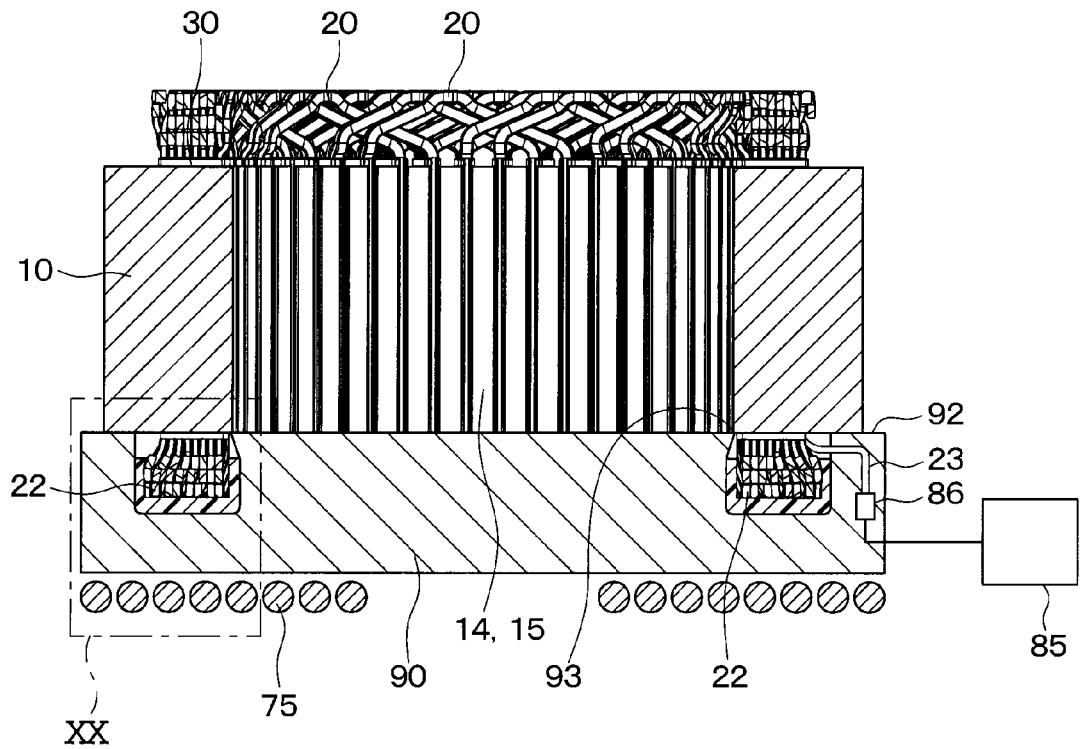
FIG. 19 is a cross-sectional view showing both the metal mold and another DRH device of the manufacturing apparatus according to the first embodiment.
Figure 20:
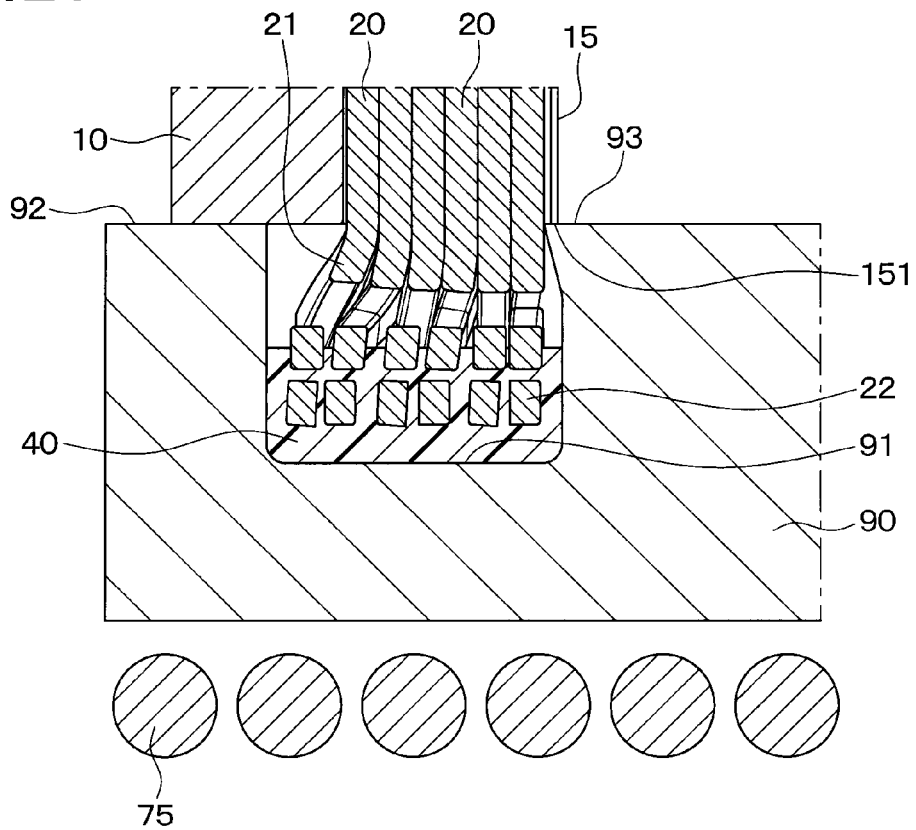
FIG. 20 is an enlarged view of the part XX in FIG. 19.

Specifically, in this step, as shown in FIGS. 19 and 20, the stator core 10 is placed on the upper surface of the metal mold 90 to have a radially outer part of the stator core 10 supported by the radially-outer upper surface 92 of the metal mold 90 and the tooth end portions 15 of the stator core 10 supported by the radially-inner upper surface 93 of the metal mold 90. More specifically, the radially-inner upper surface 93 of the metal mold 90 supports the tooth end portions 15 of the stator core 10 with the vertically lower surfaces 151 of the tooth end portions 15 abutting the radially-inner upper surface 93. Consequently, it becomes possible for the radially-inner upper surface 93 of the metal mold 90 to support the tooth end portions 15 from the lower side thereof in the axial direction of the stator core 10 so as to prevent gaps from being formed between the steel sheets 12 forming the stator core 10. That is, the radially-inner upper surface 93 of the metal mold 90 serves as a supporting portion of the metal mold 90 so as to prevent gaps from being formed between the steel sheets 12.

In the IH coil placing step S95, as shown in FIGS. 19 and 20, an IH coil 75 is placed on a lower surface of the metal mold 90. Here, the IH coil 75 is provided to heat the metal mold 90 through electromagnetic induction, thereby heating the liquid thermosetting resin, which is filled in the recess 91 of the metal mold 90 for forming the encapsulating insulator 40, to set (or harden).

In the clamping step S96, as shown in FIG. 19, the lead wires 23 of the stator coil are clamped by corresponding terminals 86 of a DRH device 85. Here, the DRH device 85 is provided to heat the stator coil through energization of the stator coil (or supply of electric current to the stator coil), thereby heating the liquid thermosetting resin, in which the coil joints 22 and those portions of the coil protruding parts 21 which are immediately adjacent to the coil joints 22 are immersed, to set (or harden).

In the IH and DRH step S97, both IH (Induction Heating) and DRH (Direct Resistance Heating) are performed on the intermediate product of the stator 1.

More specifically, in this step, the IH is performed by energizing the IH coil 75, thereby heating the metal mold 90 through electromagnetic induction; thus the liquid thermosetting resin for forming the encapsulating insulator 40 is also heated by heat transmitted from the metal mold 90. At the same time, the DRH is performed by energizing the stator coil, causing the stator coil to be heated due to its resistance to the electric current; thus the liquid thermosetting resin for forming the encapsulating insulator 40 is also heated by heat transmitted from the stator coil.

Consequently, upon being heated by both the IH and the DRH, the liquid thermosetting resin sets (or hardens) to form the encapsulating insulator 40; in the encapsulating insulator 40, there are encapsulated the coil joints 22 and those portions of the coil protruding parts 21 which are immediately adjacent to the coil joints 22.

As above, in the present embodiment, the liquid thermosetting resin for forming the encapsulating insulator 40 is heated by both the IH and the DRH, thus reducing the time required to set (or harden) the liquid thermosetting resin to form the encapsulating insulator 40 and thereby improving the productivity. However, it should be noted that the liquid thermosetting resin may alternatively be heated by only one of the IH and the DRH.

Moreover, as mentioned previously, the stator 1 according to the present embodiment includes no cuff support. Therefore, if the tooth end portions 15 were not supported by the radially-inner upper surface 93 (i.e., the supporting portion) of the metal mold 90 during the DRH, a phenomenon might occur in which the steel sheets 12 forming the stator core 10 spread in the axial direction of the stator core 10 under the repelling force between portions of the steel sheets 12 which are located adjacent to one another in the axial direction and magnetized into the same polarity during the DRH.

To prevent occurrence of the above phenomenon, in the present embodiment, the tooth end portions 15 are supported by the radially-inner upper surface 93 (i.e., the supporting portion) of the metal mold 90 in the axial direction of the stator core 10 during the DRH. Consequently, the steel sheets 12 forming the stator core 10 are prevented from spreading in the axial direction of the stator core 10 during the DRH. As a result, it becomes possible to prevent the insulators 30, which have been foamed and cured in the preceding insulator heating step S80, from being detached from the stator core 10 due to spreading of the steel sheets 12 in the axial direction.

Upon completion of the IH and DRH step S97, the lead wires 23 of the stator coil are unclamped from the corresponding terminals 86 of the DRH device 85 in the unclamping step S98.

In the IH coil removal step S99, the IH coil 75 is removed from the metal mold 90.

Figure 21:
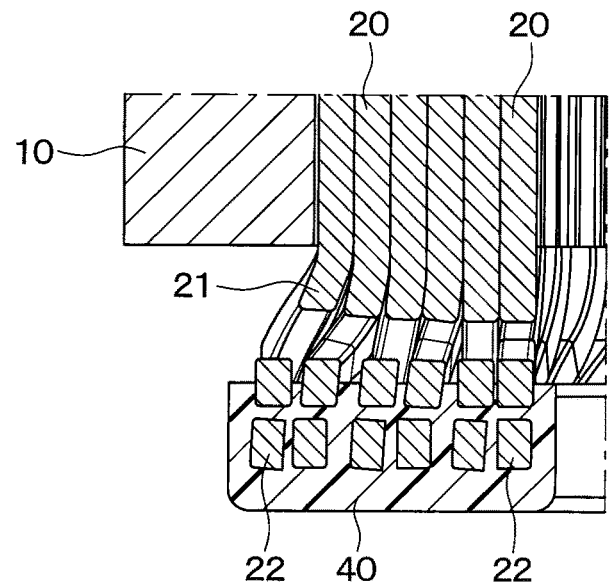
FIG. 21 is a cross-sectional view showing part of an encapsulating insulator formed in the encapsulating insulator forming step of the manufacturing method according to the first embodiment.
Figure 22:
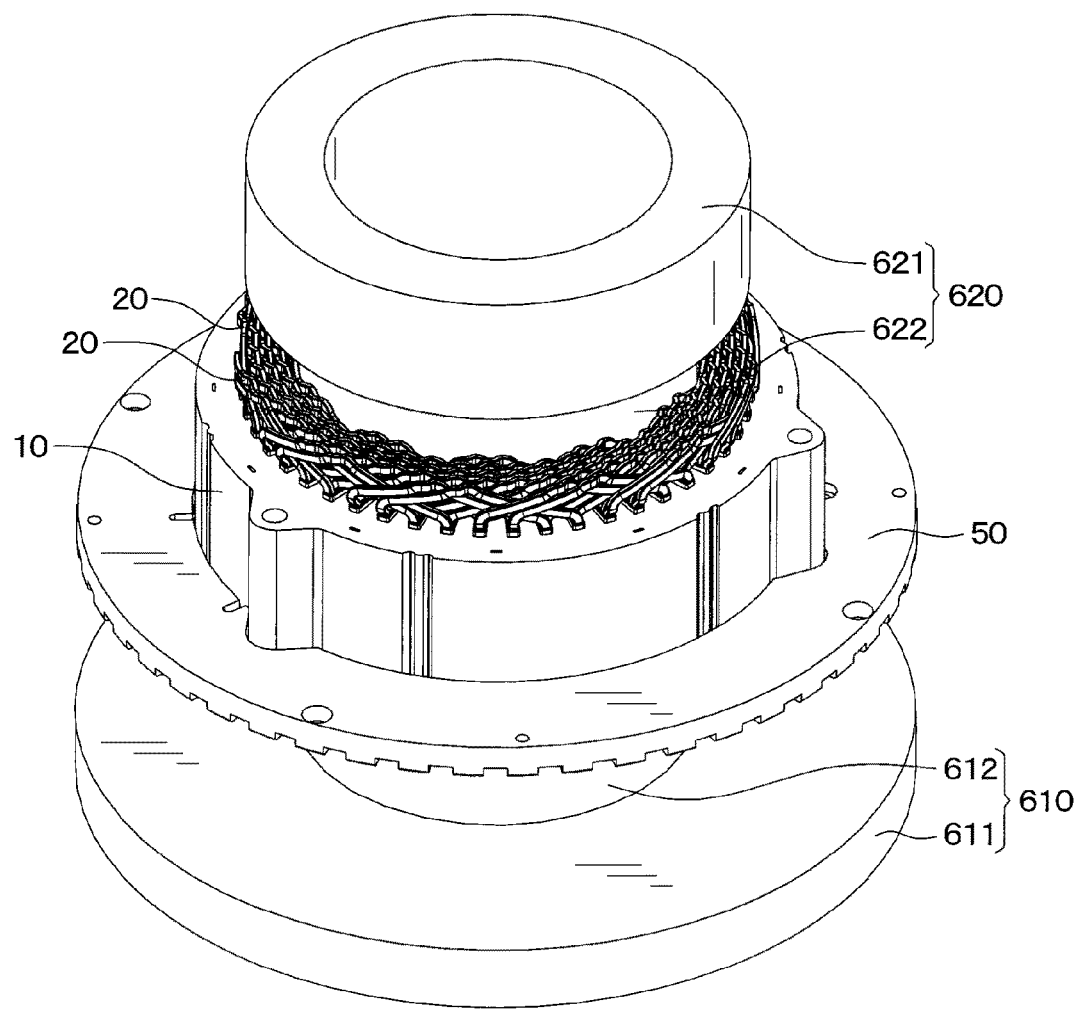
FIG. 22 is a perspective view showing a placement table, a first supporting member and a second supporting member of a manufacturing apparatus according to a second embodiment.
Figure 23:
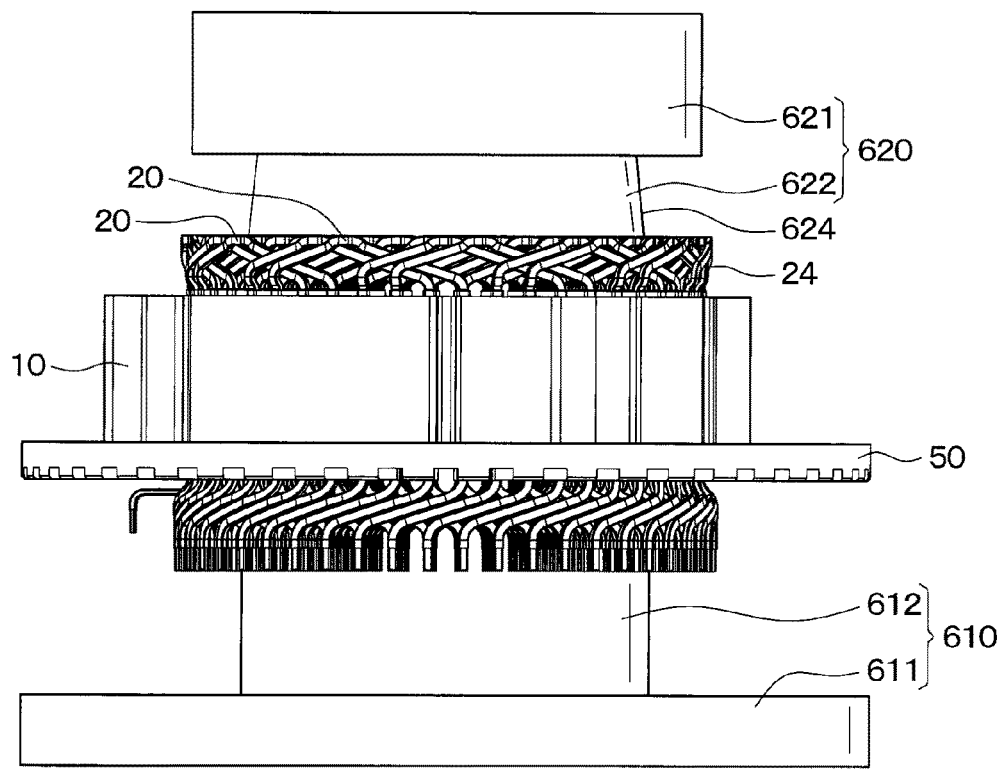
FIG. 23 is a side view showing the placement table, the first supporting member and the second supporting member of the manufacturing apparatus according to the second embodiment.
Figure 24:
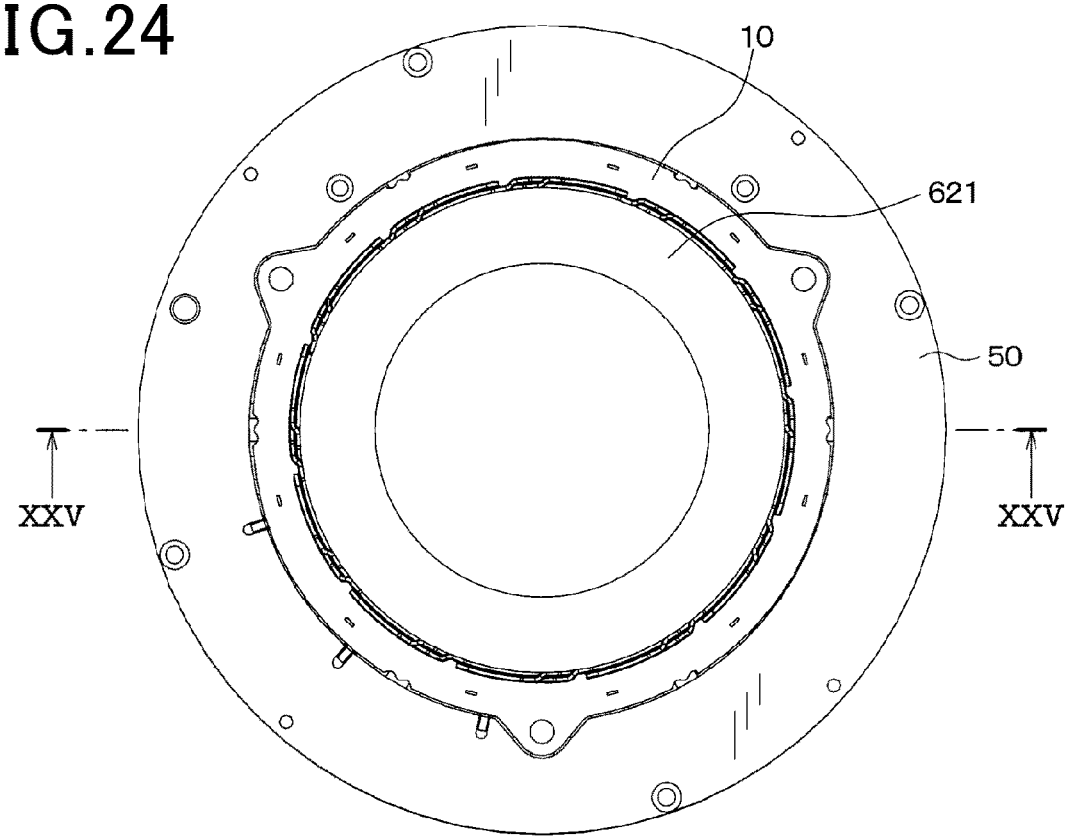
FIG. 24 is a plan view along the direction XXIV in FIG. 23.

In the metal mold stripping step S100, the metal mold 90 is stripped from the encapsulating insulator 40. Consequently, as shown in FIG. 21, in the stator 1, there is formed the encapsulating insulator 40 in which are encapsulated the coil joints 22 and those portions of the coil protruding parts 21 which are immediately adjacent to the coil joints 22.

In the metal mold removal step S101, the metal mold 90 is removed from the encapsulating insulator forming apparatus.

In the product removal step S102, the finished stator 1 is removed from the encapsulating insulator forming apparatus. Then, the encapsulating insulator forming step S90 terminates.

As a result, upon completion of all of the steps S10-S90, the stator 1 as shown in FIG. 3 is finally obtained.

According to the present embodiment, it is possible to achieve the following advantageous effects.

The apparatus for manufacturing the stator 1 according to the present embodiment includes the placement table 50, the supporting member 60 and the DRH device 80. The placement table 50 is configured to have the stator core 10, which has the coil segments 20 and the insulators 30 inserted in the slots 11 thereof, placed thereon. The supporting member 60 is configured to support, in the axial direction of the stator core 10, the tooth end portions 15 of the stator core 10 so as to prevent gaps from being formed between the steel sheets 12 forming the stator core 10. The DRH device 80 is configured to heat, through energization of the stator coil, the insulators 30 along with the stator coil and thereby cause the insulators 30 to foam.

With the above configuration, it is possible to support, during the heating of the insulators 30 by the DRH device 80, the tooth end portions 15 in the axial direction of the stator core 10 by the supporting member 60. Consequently, it is possible to prevent the steel sheets 12 forming the stator core 10 from spreading in the axial direction of the stator core 10 during the heating of the insulators 30 by the DRH device 80. Accordingly, it is also possible to prevent the material of the insulators 30 (i.e., the curable and foamable resin) from intruding between the steel sheets 12. As a result, it is possible to prevent NV (Noise and Vibration) from occurring during operation of the rotating electric machine that includes the stator 1.

Moreover, in the present embodiment, the supporting member 60 is configured to support the tooth end portions 15 of the stator core 10 from the vertically lower side of the tooth end portions 15.

When the stator core 10 is placed such that the axial direction of the stator core 10 coincides with the vertical direction, those steel sheets 12 which are located on the vertically lower side in the stator core 10 may be easily deformed under the self-weight thereof in addition to the influence of the magnetic field created during the heating of the insulators 30 by the DRH device 80. However, in the present embodiment, with the tooth end portions 15 of the stator core 10 supported by the supporting member 60 from the vertically lower side, it is still possible to prevent the steel sheets 12 forming the stator core 10 from spreading in the axial direction of the stator core 10 during the heating of the insulators 30 by the DRH device 80.

The apparatus for manufacturing the stator 1 according to the present embodiment also includes the metal mold 90, the resin supply device 95 and the DRH device 85. The metal mold 90 has the recess 91 and the supporting portion (i.e., the radially-inner upper surface) 93. The recess 91 is configured to have, at least, the coil joints 22 of the stator coil inserted therein. The supporting portion 93 is configured to support, in the axial direction of the stator core 10, the tooth end portions 15 of the stator core 10 so as to prevent gaps from being formed between the steel sheets 12 forming the stator core 10. The resin supply device 95 is configured to supply the liquid thermosetting resin for forming the encapsulating insulator 40 into the recess 9 of the metal mold 90. The DRH device 85 is configured to heat, through energization of the stator coil with at least the coil joints 22 of the stator coil immersed in the liquid thermosetting resin filled in the recess 91 of the metal mold 90, the liquid thermosetting resin along with the stator coil and thereby set the liquid thermosetting resin to form the encapsulating insulator 40.

With the above configuration, it is possible to prevent the steel sheets 12 forming the stator core 10 from spreading in the axial direction of the stator core 10 in the encapsulating insulator forming step S90. Accordingly, it is also possible to prevent the insulators 30, which have been foamed and cured in the preceding insulator heating step S80, from being detached from the stator core 10 due to spreading of the steel sheets 12 in the axial direction. As a result, no detached parts of the insulators 30 will scatter in the rotating electric machine that includes the stator 1.

The method of manufacturing the stator 1 according to the present embodiment includes the insulator heating step S80. Moreover, the insulator heating step S80 includes the product mounting step S81 (i.e., the supporting step) and the IH and DRH step S84. In the product mounting step S81, the tooth end portions 15 of the stator core 10 are supported by the supporting member 60 in the axial direction of the stator core 10, so as to prevent gaps from being formed between the steel sheets 12 forming the stator core 10. In the IH and DRH step S84, the stator coil is energized to heat the insulators 30 along with the stator coil and thereby cause the insulators 30 to foam.

With the above method, it is possible to heat the insulators 30 with the tooth end portions 15 supported by the supporting member 60 in the axial direction of the stator core 10. Consequently, it is possible to prevent the steel sheets 12 forming the stator core 10 from spreading in the axial direction of the stator core 10 in the IH and DRH step S84. Accordingly, it is also possible to prevent the material of the insulators 30 (i.e., the curable and foamable resin) from intruding between the steel sheets 12. As a result, it is possible to prevent NV from occurring during operation of the rotating electric machine that includes the stator 1.

The method of manufacturing the stator 1 according to the present embodiment also includes the encapsulating insulator forming step S90. Moreover, the encapsulating insulator forming step S90 includes the resin injection step S93 (i.e., the resin supply step), the product immersing step S94 and the IH and DRH step S97. In the resin injection step S93, the liquid thermosetting resin supplied from the resin supply device 95 is injected into the recess 91 of the metal mold 90. In the product immersing step S94, at least the coil joints 22 of the stator coil are immersed in the liquid thermosetting resin filled in the recess 91 of the metal mold 90 while the tooth end portions 15 of the stator core 10 are placed to be supported by the supporting portion (i.e., the radially-inner upper surface 93) of the metal mold 90 in the axial direction of the stator core 10, so as to prevent gaps from being formed between the steel sheets 12 forming the stator core 10. In the IH and DRH step S97, the stator coil is energized to heat the liquid thermosetting resin along with the stator coil and thereby set the liquid thermosetting resin to form the encapsulating insulator 40.

With the above method, it is possible to heat the liquid thermosetting resin for forming the encapsulating insulator 40 with the tooth end portions 15 supported by the supporting portion of the metal mold 90 in the axial direction of the stator core 10. Consequently, it is possible to prevent the steel sheets 12 forming the stator core 10 from spreading in the axial direction of the stator core 10 in the IH and DRH step S97. Accordingly, it is also possible to prevent the insulators 30, which have been foamed and cured in the preceding insulator heating step S80, from being detached from the stator core 10 due to spreading of the steel sheets 12 in the axial direction. As a result, no detached parts of the insulators 30 will scatter in the rotating electric machine that includes the stator 1.

Second Embodiment

A manufacturing apparatus for manufacturing a stator 1 according to a second embodiment has a similar configuration to the manufacturing apparatus according to the first embodiment. Therefore, only the differences of the manufacturing apparatus according to the second embodiment from the manufacturing apparatus according to the first embodiment will be described hereinafter.

FIGS. 22-26 show the configuration of an insulator heating apparatus which constitutes part of the manufacturing apparatus according to the second embodiment.

As shown in FIGS. 22-26, in the present embodiment, the insulator heating apparatus includes a pair of first and second supporting members 610 and 620 instead of the supporting member 60 in the first embodiment.

Figure 25:
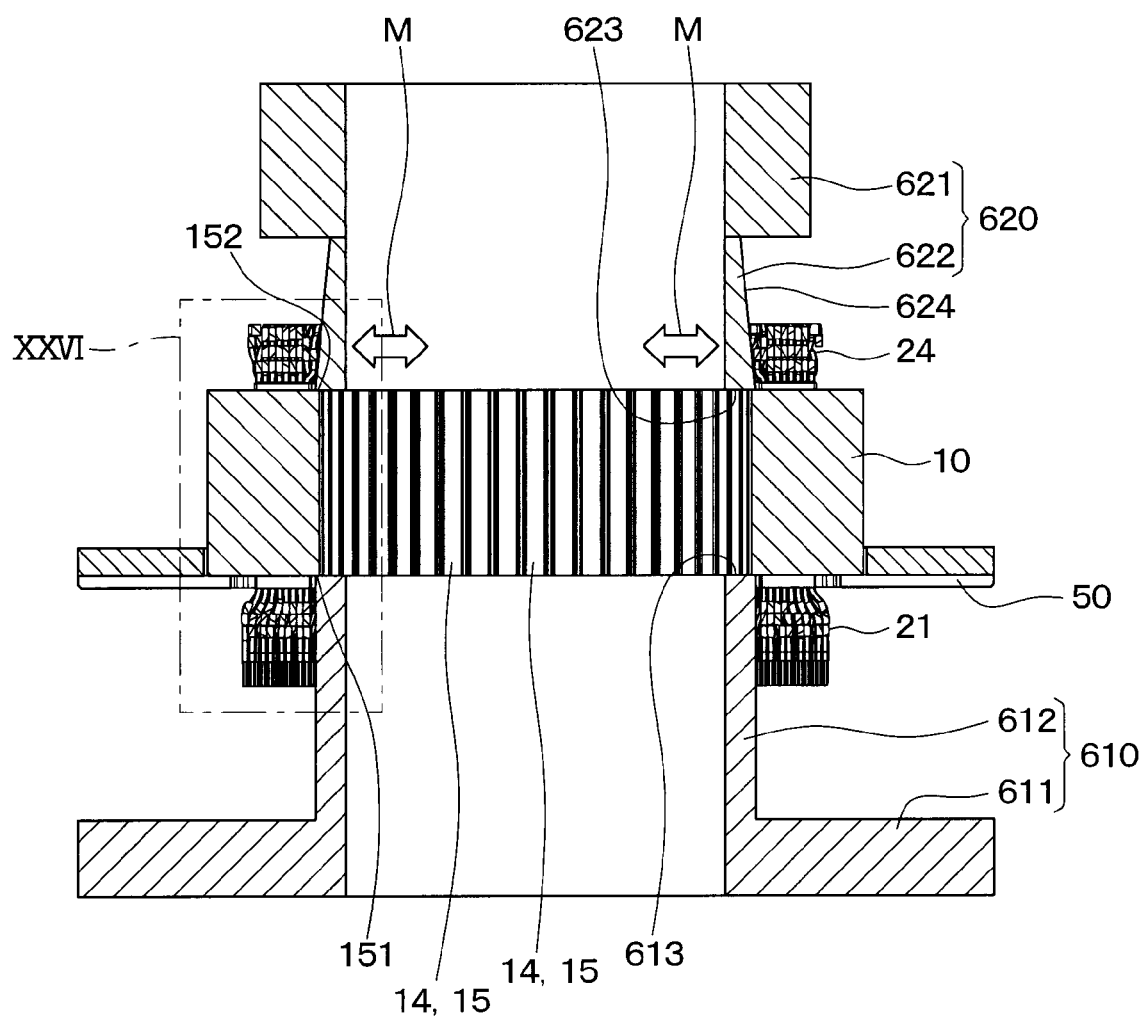
FIG. 25 is a cross-sectional view taken along the line XXV-XXV in FIG. 24.
Figure 26:
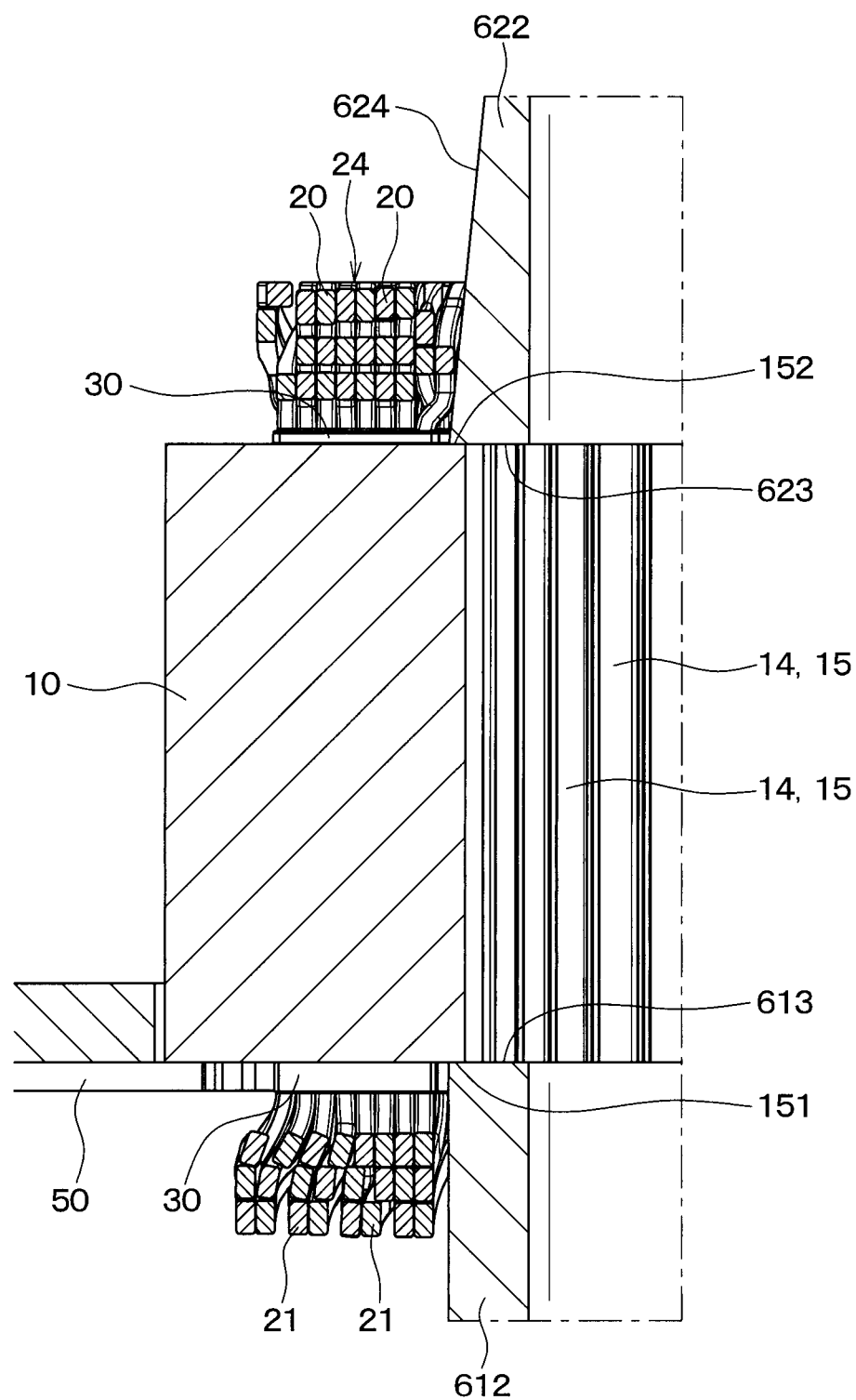
FIG. 26 is an enlarged view of the part XXVI in FIG. 25.

The first supporting member 610 has an annular base portion 611 and a cylindrical portion 612 axially extending upward from a radially inner peripheral part of the base portion 611. As shown in FIGS. 25 and 26, the cylindrical portion 612 of the first supporting member 610 is configured to support the tooth end portions 15 of the stator core 10 from a first axial side (i.e., the lower side in FIGS. 25 and 26) of the stator core 10. More specifically, the cylindrical portion 612 of the first supporting member 610 supports the tooth end portions 15 with a vertically upper end face 613 of the cylindrical portion 612 abutting vertically lower surfaces 151 of the tooth end portions 15. Consequently, it becomes possible for the first supporting member 610 to support the tooth end portions 15 from the first axial side of the stator core 10 so as to prevent gaps from being formed between the steel sheets 12 forming the stator core 10.

On the other hand, the second supporting member 620 has an annular base portion 621 and a cylindrical portion 622 axially extending downward from a radially inner peripheral part of the base portion 621. As shown in FIGS. 25 and 26, the cylindrical portion 622 of the second supporting member 620 is configured to support the tooth end portions 15 of the stator core 10 from a second axial side (i.e., the upper side in FIGS. 25 and 26) of the stator core 10. More specifically, the cylindrical portion 622 of the second supporting member 620 supports the tooth end portions 15 with a vertically lower end face 623 of the cylindrical portion 622 abutting vertically upper surfaces 152 of the tooth end portions 15. Consequently, it becomes possible for the second supporting member 620 to support the tooth end portions 15 from the second axial side of the stator core 10 so as to prevent gaps from being formed between the steel sheets 12 forming the stator core 10.

Moreover, as shown in FIGS. 25 and 26, in the present embodiment, the second coil end 24 of the stator coil, which is located on the second axial side of the stator core 10, has its radially inner part protruding radially inward from a radially-inner circumferential surface of the stator core 10. Therefore, the cylindrical portion 622 of the second supporting member 620 is configured to have its radially-outer circumferential surface 624 tapering upward. That is, the diameter of the radially-outer circumferential surface 624 of the cylindrical portion 622 gradually increases from the base portion 621 side (i.e., from the upper side) in the axial direction. Furthermore, as indicated with arrows M in FIG. 25, the cylindrical portion 622 of the second supporting member 620 is configured to be capable of changing its diameters. With this configuration, the vertically lower end face 623 of the cylindrical portion 622 of the second supporting member 620 is brought into abutment with the vertically upper surfaces 152 of the tooth end portions 15 of the stator core 10 in the following manner.

First, the cylindrical portion 622 of the second supporting member 620 is set to a small-diameter state where the maximum outer diameter of the cylindrical portion 622 is smaller than the inner diameter of the second coil end 24 of the stator coil. Then, the cylindrical portion 622 in the small-diameter state is inserted inside the second coil end 24 of the stator coil. Thereafter, the cylindrical portion 622 is switched to a large-diameter state where the maximum outer diameter of the cylindrical portion 622 is slightly larger than the inner diameter of the stator core 10. Consequently, the vertically lower end face 623 of the cylindrical portion 622 is brought into abutment with the vertically upper surfaces 152 of the tooth end portions 15. As a result, it becomes possible for the second supporting member 620 to support the tooth end portions 15 from the second axial side of the stator core 10.

With the tooth end portions 15 supported by the first and second supporting members 610 and 620 respectively from the first and second axial sides of the stator core 10, the IH and DRH step S84 is performed as described in the first embodiment.

According to the present embodiment, it is possible to further achieve the following advantageous effects.

The apparatus for manufacturing the stator 1 according to the present embodiment includes the first supporting member 610 configured to support the tooth end portions 15 from the first axial side of the stator core 10 and the second supporting member 620 configured to support the tooth end portions 15 from the second axial side of the stator core 10.

With the above configuration, it is possible to support, during the heating of the insulators 30 by the DRH device 80, the tooth end portions 15 from both the axial sides of the stator core 10. Consequently, it is possible to prevent, over the entire axial range of the stator core 10, the steel sheets 12 forming the stator core 10 from spreading in the axial direction of the stator core 10 during the heating of the insulators 30 by the DRH device 80. Accordingly, it is also possible to prevent, over the entire axial range of the stator core 10, the material of the insulators 30 (i.e., the curable and foamable resin) from intruding between the steel sheets 12. As a result, it is possible to more reliably prevent NV from occurring during operation of the rotating electric machine that includes the stator 1.

The method of manufacturing the stator 1 according to the present embodiment includes the insulator heating step S80. Moreover, the insulator heating step S80 includes the product mounting step S81 (i.e., the supporting step) and the IH and DRH step S84. In the product mounting step S81, the tooth end portions 15 of the stator core 10 are supported by the first and second supporting members 610 and 620 respectively from the first and second axial sides of the stator core 10, so as to prevent gaps from being formed between the steel sheets 12 forming the stator core 10. In the IH and DRH step S84, the stator coil is energized to heat the insulators 30 along with the stator coil and thereby cause the insulators 30 to foam.

With the above method, it is possible to heat the insulators 30 with the tooth end portions 15 supported by the first and second supporting members 610 and 620 respectively from the first and second axial sides of the stator core 10. Consequently, it is possible to prevent, over the entire axial range of the stator core 10, the steel sheets 12 forming the stator core 10 from spreading in the axial direction of the stator core 10 in the IH and DRH step S84. Accordingly, it is also possible to prevent, over the entire axial range of the stator core 10, the material of the insulators 30 (i.e., the curable and foamable resin) from intruding between the steel sheets 12. As a result, it is possible to more reliably prevent NV from occurring during operation of the rotating electric machine that includes the stator 1.

Third Embodiment

In the above-described first embodiment, the insulators 30 are formed of the curable and foamable resin. Moreover, the insulators 30 heated in the insulator heating step S80 to foam, filling vacant spaces in the slots 11 of the stator core 10 and thereby fixing the stator coil (i.e., the coil segments 20) in the slots 11.

In contrast, in the third embodiment, the insulators 30 are formed of, for example, insulating paper instead of the curable and foamable resin. Moreover, the stator coil (i.e., the coil segments 20) is fixed in the slots 11 of the stator core 10 by impregnating an impregnation material into the slots 11 and heating the impregnation material to cure (or harden) in the slots 11.

Figure 27:
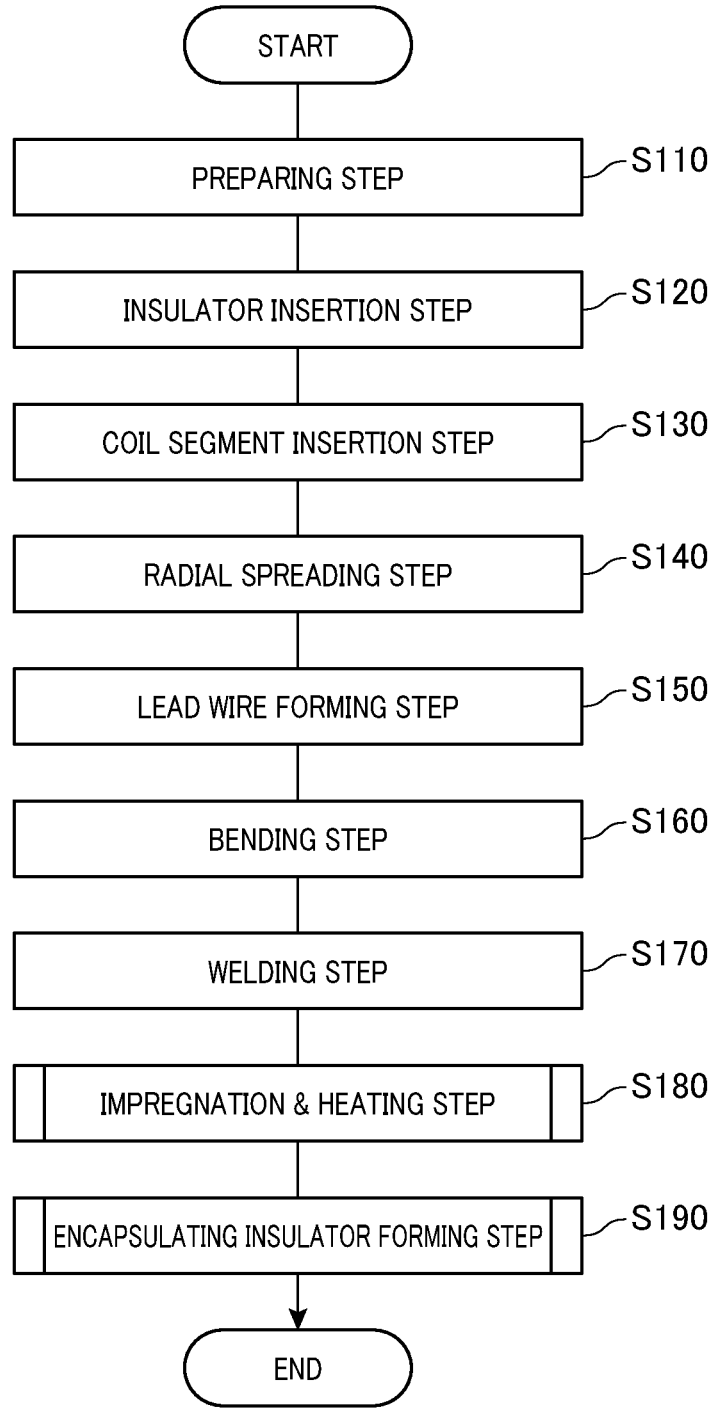
FIG. 27 is a flowchart illustrating a manufacturing method according to a third embodiment.

FIG. 27 is a flowchart illustrating the outline of a method for manufacturing the stator 1 according to the third embodiment.

As shown in FIG. 27, the manufacturing method according to the third embodiment includes a preparing step S110, an insulator insertion step S120, a coil segment insertion step S130, a radial spreading step S140, a lead wire forming step S150, a bending step S160, a welding step S170, an impregnation and heating step S180 and an encapsulating insulator forming step S190.

First, in the preparing step S110, the stator core 10, the coil segments 20 for forming the stator coil, and the insulators 30 are prepared.

In the insulator insertion step S120, the insulators 30 are respectively inserted into the corresponding slots 11 of the stator core 10. Consequently, the insulators 30 are respectively located inside the interior walls of the stator core 10 defining the corresponding slots 11. As mentioned above, in the third embodiment, the insulators 30 are formed of, for example, insulating paper.

It should be noted that the stator 1 may alternatively be configured to include no insulators 30; thus the insulator insertion step S120 may be omitted from the manufacturing method according to the third embodiment.

The steps S130-S170 of the manufacturing method according to the third embodiment are respectively identical to the steps S30-S70 of the manufacturing method according to the first embodiment. Therefore, description of the steps S130-S170 is omitted hereinafter.

In the impregnation and heating step S180, the impregnation material is impregnated into the slots 11 of the stator core 10 and heated by both IH (Induction Heating) and DRH (Direct Resistance Heating) to cure in the slots 11. In addition, the impregnation material may be implemented by, for example, varnish.

Figure 28:
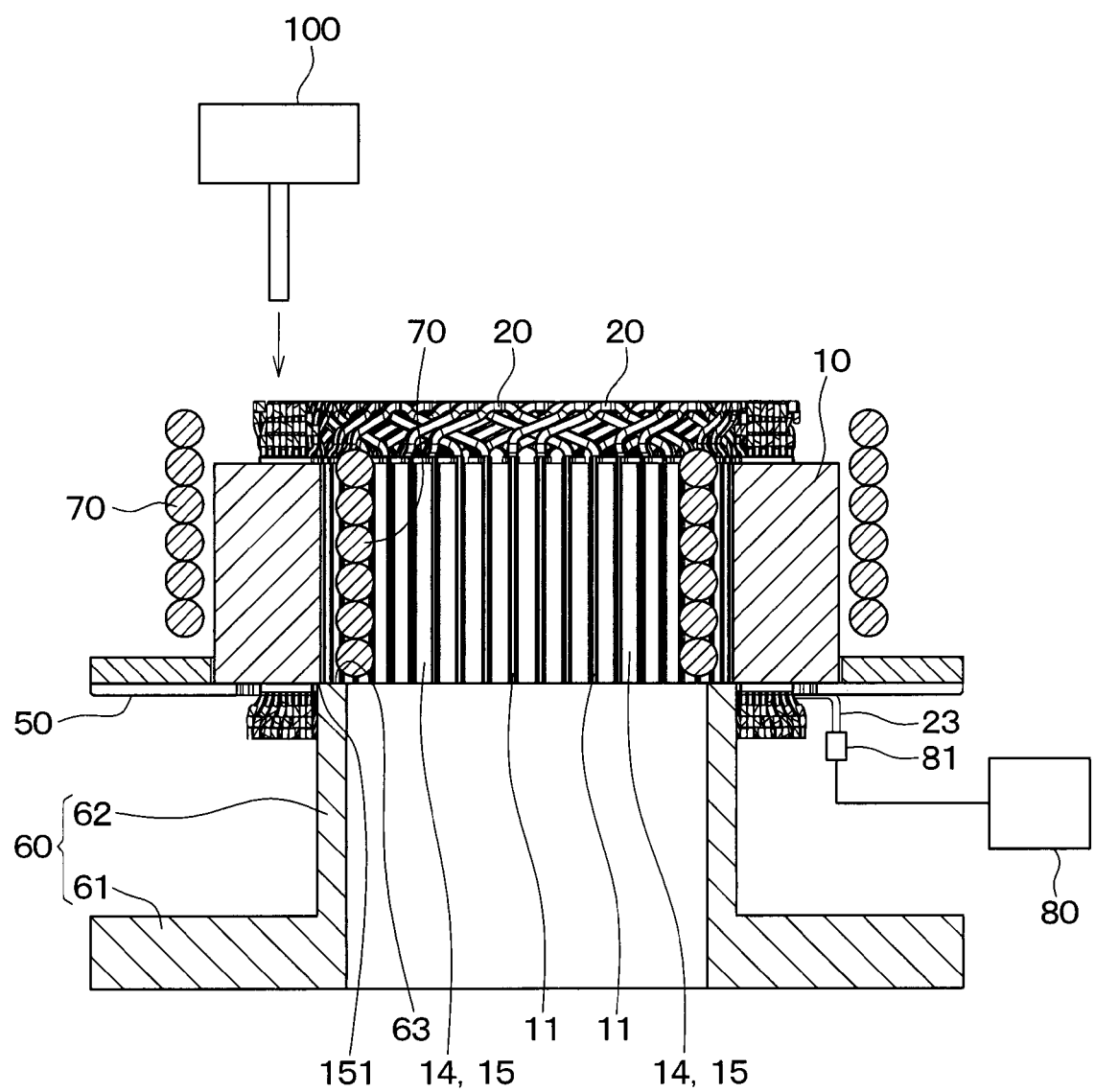
FIG. 28 is a partially cross-sectional view showing a placement table, a supporting member, an IH coil, a DRH device and an impregnation device of a manufacturing apparatus according to the third embodiment.

FIG. 28 shows the configuration of an impregnation and heating apparatus for performing the impregnation and heating step S180.

As shown in FIG. 28, the impregnation and heating apparatus, which constitutes part of an apparatus for manufacturing the stator 1 according to the third embodiment, includes a placement table 50, a supporting member 60, an IH coil 70 and a DRH device 80 and an impregnation device 100.

The placement table 50, the supporting member 60, the IH coil 70 and the DRH device 80 of the impregnation and heating apparatus according to the third embodiment are respectively identical to those of the insulator heating apparatus according to the first embodiment. Therefore, description of the placement table 50, the supporting member 60, the IH coil 70 and the DRH device 80 is not repeated hereinafter.

The impregnation device 100 is configured to impregnate the impregnation material, which is in a liquid state, into the slots 11 of the stator core 10. More particularly, in the present embodiment, as shown in FIG. 28, the impregnation device 100 is configured to impregnate the impregnation material from the vertically upper side of the stator core 10 into the slots 11 of the stator core 10 in the axial direction of the stator core 10.

It should be noted that the configuration of the impregnation device 100 is not limited to the above. For example, the impregnation device 100 may alternatively be configured to impregnate the impregnation material from the radially inside of the stator core 10 into the slots 11 of the stator core 10. As another alternative, the stator core 10 having the coil segments 20 inserted in the slots 11 thereof may be immersed in the liquid impregnation material filled in a container.

After impregnation of the impregnation material into the slots 11 of the stator core 10, the impregnation material is heated by both IH and DRH to cure in the slots 11. Consequently, the stator coil (i.e., the coil segments 20) is fixed in the slots 11 of the stator core 10 by the impregnation material.

As above, in the present embodiment, the impregnation material is heated by both the IH and the DRH, thus reducing the time required to cure the impregnation material and thereby improving the productivity. However, it should be noted that the impregnation material may alternatively be heated by only one of the IH and the DRH.

In the present embodiment, the tooth end portions 15 of the stator core 10 are supported by the supporting member 60 in the axial direction of the stator core 10 during the heating of the impregnation material by the DRH. Consequently, the steel sheets 12 forming the stator core 10 are prevented from spreading in the axial direction of the stator core 10 during the DRH. As a result, it becomes possible to prevent the impregnation material from intruding and curing between the steel sheets 12.

Referring back to FIG. 27, in the encapsulating insulator forming step S190, the coil joints 22 and those portions of the coil protruding parts 21 which are immediately adjacent to the coil joints 22 are encapsulated by the encapsulating insulator 40. The encapsulating insulator forming step S190 is identical to the encapsulating insulator forming step S90 described in the first embodiment. Therefore, detailed description of the encapsulating insulator forming step S190 is omitted hereinafter.

According to the third embodiment, it is possible to achieve the following advantageous effects.

The apparatus for manufacturing the stator 1 according to the present embodiment includes the placement table 50, the supporting member 60, the impregnation device 100 and the DRH device 80. The placement table 50 is configured to have the stator core 10, which has the coil segments 20 and the insulators 30 inserted in the slots 11 thereof, placed thereon. The supporting member 60 is configured to support, in the axial direction of the stator core 10, the tooth end portions 15 of the stator core 10 so as to prevent gaps from being formed between the steel sheets 12 forming the stator core 10. The impregnation device 100 is configured to impregnate the impregnation material in a liquid state into the slots 11 of the stator core 10. The DRH device 80 is configured to heat, through energization of the stator coil, the impregnation material along with the stator coil and thereby cure the impregnation material in the slots 11.

With the above configuration, it is possible to support, during the heating of the impregnation material by the DRH device 80, the tooth end portions 15 in the axial direction of the stator core 10 by the supporting member 60. Consequently, it is possible to prevent the steel sheets 12 forming the stator core 10 from spreading in the axial direction of the stator core 10 during the heating of the impregnation material by the DRH device 80. Accordingly, it is also possible to prevent the impregnation material from intruding and curing between the steel sheets 12. As a result, it is possible to prevent NV from occurring during operation of the rotating electric machine that includes the stator 1.

The method of manufacturing the stator 1 according to the present embodiment includes the impregnation and heating step S180. In the impregnation and heating step S180, the tooth end portions 15 of the stator core 10 are supported by the supporting member 60 in the axial direction of the stator core 10, so as to prevent gaps from being formed between the steel sheets 12 forming the stator core 10. Moreover, the impregnation material in a liquid state is impregnated into the slots 11 of the stator core 10. Furthermore, the stator coil is energized to heat the impregnation material along with the stator coil and thereby cure the impregnation material in the slots 11. That is, in the present embodiment, the impregnation and heating step S180 includes a supporting step, an impregnation step and a resistance heating step.

With the above method, it is possible to heat the impregnation material with the tooth end portions 15 supported by the supporting member 60 in the axial direction of the stator core 10. Consequently, it is possible to prevent the steel sheets 12 forming the stator core 10 from spreading in the axial direction of the stator core 10 in the impregnation and heating step S180. Accordingly, it is also possible to prevent the impregnation material from intruding and curing between the steel sheets 12. As a result, it is possible to prevent NV from occurring during operation of the rotating electric machine that includes the stator 1.

While the above particular embodiments have been shown and described, it will be understood by those skilled in the art that various modifications, changes and improvements may be made without departing from the spirit of the present disclosure.

For example, in the first and third embodiments, the tooth end portions 15 of the stator core 10 are supported by the supporting member 60 in the insulator heating step S80 or the impregnation and heating step S180. However, the tooth end portions 15 may be supported by the supporting member 60 also in the steps S20-S70 or the steps S120-S170. In these cases, it is preferable for the supporting member 60 to support the tooth end portions 15 from the first axial side of the stator core 10 while the insulators 30 and the coil segments 20 are inserted into the slots 11 of the stator core 10 from the second axial side of the stator core 10. Consequently, during the insertion of the insulators 30 into the slots 11 of the stator core 10, it is possible to prevent the steel sheets 12 forming the stator core 10 from spreading in the axial direction of the stator core 10 under the friction force between the insulators 30 and the interior walls of the stator core 10 defining the slots 11. Similarly, during the insertion of the coil segments 20 into the slots 11 of the stator core 10, it is possible to prevent the steel sheets 12 from spreading in the axial direction of the stator core 10 under the friction force between the coil segments 20 and the inner surfaces of the insulators 30 which face the coil segments 20. In addition, it is also possible to prevent the steel sheets 12 from being deformed vertically downward under the self-weight thereof.

In the second embodiment, the tooth end portions 15 of the stator core 10 are supported by the first and second supporting members 610 and 620 respectively from the first and second axial sides of the stator core 10 in the insulator heating step S80. Similarly, in the encapsulating insulator forming step S90, the second supporting member 620 may be employed to support the vertically upper surfaces 152 of the tooth end portions 15 while the vertically lower surfaces 151 of the tooth end portions 15 are supported by the radially-inner upper surface 93 (i.e., the supporting portion) of the metal mold 90. In this case, it is possible to prevent, over the entire axial range of the stator core 10, the steel sheets 12 forming the stator core 10 from spreading in the axial direction of the stator core 10 during the heating of the thermosetting resin (i.e., the material of the encapsulating insulator 30) by the DRH.

In the third embodiment, the tooth end portions 15 of the stator core 10 are supported by the single supporting member 60 from the first axial side (i.e., the vertically lower side) of the stator core 10 in the impregnation and heating step S180. Alternatively, the tooth end portions 15 may be supported, in the impregnation and heating step S180, by the first and second supporting members 610 and 620 respectively from the first and second axial sides of the stator core 10 as in the second embodiment.

In the above-described embodiments, during the manufacture of the stator 1, the stator core 10 is placed such that the axial direction of the stator core 10 coincides with the vertical direction. However, the stator core 10 may alternatively be placed such that the axial direction of the stator core 10 is, for example, perpendicular to the vertical direction (i.e., coincident with a horizontal direction). In this case, the supporting member 60 described in the first embodiment would support the tooth end portions 15 from one side of the stator core 10 in the horizontal direction. On the other hand, the first and second supporting members 610 and 620 described in the second embodiment would support the tooth end portions 15 respectively from opposite sides of the stator core 10 in the horizontal direction.

What is claimed is:

1. A method of manufacturing a stator for a rotating electric machine, the method comprising:
    forming a stator core from a plurality of steel sheets that are laminated in an axial direction of the stator core, the stator core being annular and having (i) a plurality of teeth, which each extend in a radial direction of the stator core and are arranged at predetermined intervals in a circumferential direction of the stator core, and (ii) a plurality of slots that are each formed between one circumferentially-adjacent pair of the teeth;
    respectively inserting insulators into the slots of the stator core, the insulators being formed of a material that is foamable upon being heated;
    inserting coil segments into the slots of the stator core;
    joining the coil segments to form a stator coil;
    supporting, with a supporting member, distal end portions of the teeth of the stator core in the axial direction so as to prevent gaps from being formed between the steel sheets forming the stator core; and
    energizing the stator coil to heat the insulators along with the stator coil and thereby cause the insulators to foam.

2. The method as set forth in claim 1, wherein the supporting member comprises a first supporting member and a second supporting member, and
    during the supporting, the distal end portions of the teeth of the stator core are supported by the first and second supporting members respectively from opposite axial sides of the stator core.

3. A method of manufacturing a stator for a rotating electric machine, the method comprising:
    forming a stator core from a plurality of steel sheets that are laminated in an axial direction of the stator core, the stator core being annular and having (i) a plurality of teeth, which each extend in a radial direction of the stator core and are arranged at predetermined intervals in a circumferential direction of the stator core, and (ii) a plurality of slots that are each formed between one circumferentially adjacent pair of the teeth;
    inserting coil segments into the slots of the stator core;
    joining the coil segments to form a stator coil;
    supporting, with a supporting member, distal end portions of the teeth of the stator core in the axial direction so as to prevent gaps from being formed between the steel sheets forming the stator core;
    impregnating impregnation material in a liquid state into the slots of the stator core; and
    energizing the stator coil to heat the impregnation material along with the stator coil and thereby cure the impregnation material in the slots.

4. The method as set forth in claim 3, wherein the supporting member comprises a first supporting member and a second supporting member, and
    during the supporting, the distal end portions of the teeth of the stator core are supported by the first and second supporting members respectively from opposite axial sides of the stator core.

* * * * *